(12) United States Patent
Deloach, Jr. et al.

(10) Patent No.: US 7,383,049 B2
(45) Date of Patent: Jun. 3, 2008

(54) AUTOMATION OF MAINTENANCE AND IMPROVEMENT OF LOCATION SERVICE PARAMETERS IN A DATA BASE OF A WIRELESS MOBILE COMMUNICATION SYSTEM

(75) Inventors: James D. Deloach, Jr., Sunnyvale, CA (US); Alkinoos H. Vayanos, San Diego, CA (US); Bruce Wilson, Palo Alto, CA (US); Richard John Girerd, Mountain View, CA (US); Grant Marshall, Campbell, CA (US); Mark Moeglein, Ashland, OR (US); Roland Rick, San Diego, CA (US); Scott Smith, San Jose, CA (US); Sunil Patel, San Jose, CA (US); Wyatt Riley, Fremont, CA (US); Zoltan Biacs, San Mateo, CA (US)

(73) Assignee: Qualcomm Incorporated, San Diego, CA (US)

( * ) Notice: Subject to any disclaimer, the term of this patent is extended or adjusted under 35 U.S.C. 154(b) by 404 days.

(21) Appl. No.: 10/093,751

(22) Filed: Mar. 7, 2002

(65) Prior Publication Data
US 2003/0125044 A1 Jul. 3, 2003

Related U.S. Application Data

(60) Provisional application No. 60/343,748, filed on Dec. 27, 2001.

(51) Int. Cl.
*H04Q 7/20* (2006.01)
(52) U.S. Cl. .................. 455/456.1; 455/404.2; 455/414.2; 455/422.1; 455/423; 342/357.02
(58) Field of Classification Search .......... 455/404.2, 455/456.1, 456.5, 457, 414.2, 422.1, 423; 342/357.02, 357.03
See application file for complete search history.

(56) References Cited

U.S. PATENT DOCUMENTS

| | | | |
|---|---|---|---|
| 6,014,102 A * | 1/2000 | Mitzlaff et al. ............ | 342/457 |
| 6,166,685 A | 12/2000 | Soliman .................. | 342/357.1 |
| 6,230,018 B1 * | 5/2001 | Watters et al. ........... | 455/456.3 |
| 6,243,587 B1 * | 6/2001 | Dent et al. ............... | 455/456.2 |
| 6,275,707 B1 * | 8/2001 | Reed et al. .............. | 455/456.3 |
| 6,314,294 B1 * | 11/2001 | Benveniste ............. | 455/452.2 |
| 6,362,778 B2 * | 3/2002 | Neher ................... | 342/357.07 |
| 6,799,050 B1 | 9/2004 | Krasner | |
| 2002/0065107 A1 * | 5/2002 | Harel et al. ................ | 455/562 |
| 2002/0175855 A1 * | 11/2002 | Richton et al. ........ | 342/357.02 |

FOREIGN PATENT DOCUMENTS

| | | |
|---|---|---|
| EP | 1122554 | 8/2001 |
| WO | 0173466 | 10/2001 |

OTHER PUBLICATIONS

International Search Report ISA EPO PCT/US02/41255 Aug. 13, 2003.

* cited by examiner

*Primary Examiner*—Nghi H. Ly
(74) *Attorney, Agent, or Firm*—Thomas Rouse; Richard Bachand; Linda G. Gunderson

(57) ABSTRACT

In a wireless telecommunication network, hybrid (GPS and AFLT) mobile stations provide redundant position information, which is used for time base calibration and/or correction of position measurements. Every mobile station (i.e., handset or cellular phone) can be used as a test instrument, and data from regular wireless phone calls can be supplemented by data from drive-around field test units. The time base and/or position offsets are stored in a base station almanac data base along with other information used for obtaining the most reliable position fixes under a variety of conditions. An automatic system is provided for creating, updating, and maintaining the base station almanac data base. The automatic system not only characterizes the performance of the wireless network but also characterizes the performance of the position determination system. The automatic system provides performance feedback to system operators and customers.

51 Claims, 20 Drawing Sheets

| FIELD NAME | DESCRIPTION |
|---|---|
| Pilot sector name | 50-byte ASCII string |
| System ID | INT2 (16 bits) |
| Network ID | INT2 (16 bits) |
| Extended base ID | INT4 (32 bits) |
| Transmit PN | INT4 (32 bits) |
| Antenna latitude | DOUBLE (64 bits) degrees |
| Antenna longitude | DOUBLE (64 bits) degrees |
| Antenna altitude | INT4 (32 bits) meters |
| Antenna location accuracy | UINT2 (16 bits) centimeters |
| Antenna orientation | INT4 (32 bits) degrees |
| Antenna opening | INT4 (32 bits) degrees |
| Maximum antenna range | INT4 (32 bits) meters |
| Rtd calibration | DOUBLE (64 bits) chipx8 |
| Rtd calibration accuracy | UINT2 (16 bits) chipx64 |
| Fwd link calibration | DOUBLE (64 bits) chipx8 |
| Fwd link calibration accuracy | UINT2 (16 bits) chipx64 |
| Potential repeater | INT2 (16 bits) |
| PN increment | INT2 (16 bits) |
| Format Type | UCHAR (8 bits) |
| MSC Switch Number | INT2 (16 bits) |

FIG. 4

| FIELD NAME | DESCRIPTION |
|---|---|
| Sector Center Latitude | DOUBLE (64 bits) degrees |
| Sector Center Longitude | DOUBLE (64 bits) degrees |
| Sector Center Altitude | INT4 (32 bits) meters |
| Terrain Average Height | INT4 (32 bits) meters |
| Terrain Height Standard Dev. | INT4 (32 bits) meters |

FIG. 5

| BSA Field Groups |
|---|
| Cell Sector Identify Information (in IS-95: Network ID, System ID, Switch Number, Extended Base Station ID, plus PN) |
| Pilot Sector Name |
| Antenna Position - Latitude, Longitude, and Altitude (height above ellipsoid) |
| Cell Sector Centroid Position - Latitude, Longitude, and Altitude (Height above ellipsoid) |
| Antenna Orientation |
| Antenna Opening |
| Maximum Antenna Range (MAR) |
| Terrain Average Height |
| RTD Calibration |
| FWD Link Calibration |
| Potential Repeater |
| PN Increment |
| Uncertainty Parameters |

FIG. 13

| Calibration Data Base Field Group | Description | Problem Detection Methodology / Calibration Data Base Server Function Using this Parameter |
|---|---|---|
| Cell Sector Identity Information (in IS-95: Network ID, System ID, Switch Number, Extended Base Station ID, plus PN) | Identity information is the key to relating signals observed by a handset to information in the calibration data base. Identity information in particular must be complete and accurate, and must be free of duplication or error for good location determination performance. New or modified cellular infrastructure or cellular infrastructure configuration changes, result in identity changes. Such changes are frequent. | • Spot all instances where an identity observed by a handset is not found in the calibration data base. Track such occurrences over time.<br>• Identify *new* sectors added to the network. Advise operator. Generate a calibration data base entry including determination of the antenna location, the observed identity, calibration and uncertainty parameters calculated automatically, and default values.<br>• Identify sectors whose identity observed by the handset or reported by the cellular infrastructure has changed due to a network change or reconfiguration and no longer matches the calibration data base. Automatically alter the calibration data base to reflect the new identity. |

FIG. 14

| Calibration Data Base Field Group | Description | Problem Detection Methodology / Calibration Data Base Server Function Using this Parameter |
|---|---|---|
| Antenna Position – Latitude, Longitude, and Altitude (height above ellipsoid) | For terrestrial range measurements, antenna position helps the PDE to resolve the reference sector and measurement sector identities, and is the location from where the range measurements originate. Antenna position errors translate into terrestrial range errors. Antenna position is also essential in generating an "initial position estimate", which is used to generate GPS assist information. | • Identify calibration data base sector antenna positions that are not consistent with the measured position. This can result from mobile cells (COWs and COLTs) or from calibration data base typos. Advise operator. If so configured, automatically fix. |

FIG. 15

| Calibration Data Base Field Group | Description | Problem Detection Methodology / Calibration Data Base Server Function Using this Parameter |
|---|---|---|
| Cell Sector Centroid Position – Latitude, Longitude, and Altitude (height above ellipsoid) | Sector centroid position is returned as the result when more accurate location determination methods fail. Also, sector centroid position is also essential in generating an "initial position estimate", which is used to generate GPS assist information.<br><br>The cell sector centriod is one of the parameters that helps the PDE understand the sector coverage area. Knowledge of the sector coverage area is key to successfully relating observed terrestrial signals to an entry in the calibration data base. | • Map the sector coverage area and thus the most optimal cell sector centroid position over time. Update calibration data base as needed. |

FIG. 16

| Calibration Data Base Field Group | Description | Problem Detection Methodology / Calibration Data Base Server Function Using this Parameter |
|---|---|---|
| Antenna Orientation | The direction the cell sector antenna is pointed. Antenna orientation is often used to determine the approximate sector coverage region and sector centroid position with off-line tools. | • Map the sector coverage area and thus the most optimal Antenna Orientation over time. Update calibration data base as needed. |
| Antenna Opening | Antenna opening (beam width) is often used to determine the approximate sector coverage region and sector center position with off-line tools. | • Map the sector coverage area and thus the most optimal Antenna Opening over time. Update calibration data base as needed. |
| Maximum Antenna Range (MAR) | Maximum Antenna Range is the key parameter used by the PDE to quantify the sector coverage area. Knowledge of the sector coverage area is key to successfully relating the observed terrestrial signal to an entry in the calibration data base. | • Map the sector coverage area and thus the most optimal MAR over time. Update calibration data base as needed. |

FIG. 17

| Calibration Data Base Field Group | Description | Problem Detection Methodology / Calibration Data Base Server Function Using this Parameter |
|---|---|---|
| Terrain Average Height | Terrain average height is required with AFLT because without a height constraint, AFLT fixes could drift wildly. Also knowledge of height allows one few measurement to come from a range measurement, which can greatly improve location fix availability. | • Generate Terrain Average Height using an altitude database.<br>• Track the heights returned from location fixes with low uncertainties. Correct the Terrain Average Height in the calibration data base as required, and automatically set terrain standard deviation to reflect the distribution of actual fixes. |

FIG. 18

| Calibration Data Base Field Group | Description | Problem Detection Methodology / Calibration Data Base Server Function Using this Parameter |
|---|---|---|
| RTD Calibration | RTD calibration is intended specifically to improve the accuracy of reverse-link AFLT range measurements. | • Automatically improve *RTD calibration* and *RTD calibration accuracy* over time using real user measurements. |
| FWD Link Calibration | Forward link calibration is intended specifically to improve the accuracy of forward-link terrestrial AFLT range measurements in IS-95 CDMA systems. Forward link calibration errors translate into AFLT Range measurement errors, which translate into fix errors. | • Automatically improve *forward link calibration* and *forward link calibration accuracy* over time using real user measurements. |

FIG. 19

| Calibration Data Base Field Group | Description | Problem Detection Methodology / Calibration Data Base Server Function Using this Parameter |
|---|---|---|
| Potential Repeater | If a repeater is used and the PDE does not know about it, AFLT range measurements can be wildly wrong, and the AFLT algorithm becomes unstable. For this reason, any sector identity with a repeater used must be noted in the calibration data base. | • Detect the presence of an un-noted repeater. Make appropriate fixes to the calibration data base.<br>• Track how frequently each noted repeater is observed. Remove the repeater use flag or advise an operator if a repeater is believed not to exist. |
| PN Increment | PN increment helps the PDE to correctly resolve the PN offset numbers of distant base stations. Since it is so easy to know, there is no reason not to include it. | • Detect PN increment inconsistency between what is observed over the air and what is in the calibration data base. If inconsistent, fix. |

FIG. 20

| Calibration Data Base Field Group | Description | Problem Detection Methodology / Calibration Data Base Server Function Using this Parameter |
|---|---|---|
| Uncertainty Parameters | Uncertainty parameters, such as "antenna location accuracy", "terrain height standard deviation", "RTD calibration accuracy", and "FLC accuracy" give bounds to their respective calibration data base parameters and allow the PDE to construct an overall uncertainty to the range measurements that uses these parameters, and thus an error estimate for the final position fix. | • When highly accurate final location fixes are available, use this knowledge to assess the uncertainty of the terrestrial range measurements seen in these fixes. Allocate this uncertainty to the uncertainty parameters that were used to construct each range. Automatically update uncertainty parameters once a sufficient number of samples exist to establish confidence in the new values. Track changes over time, making updates as needed. |

FIG. 21

| PROBLEM DETECTION METHODS THAT USE AN ESTIMATE OF THE CELLULAR HANDSET'S POSITION |
|---|
| INVERSE SECTOR ANTENNA POSITIONING |
| FORWARD LINK CALIBRATION AND RTD CALIBRATION |
| RESOLVING INCORRECT SECTOR IDENTITY IN THE PDE |
| SPOTTING THE PRESENCE OF REPEATERS |
| SPOTTING NEW OR MOVED SECTORS |
| DETERMINING UNCERTAINTY PARAMETERS |
| PROVIDING CELLULAR COVERAGE MAPS & DIAGNOSTIC INFORMATION |
| PROVIDING FEEDBACK TO USERS ABOUT CELLULAR SYSTEM OR LOCATION PERFORMANCE. |

FIG. 22

AUTOMATION OF MAINTENANCE AND IMPROVEMENT OF LOCATION SERVICE PARAMETERS IN A DATA BASE OF A WIRELESS MOBILE COMMUNICATION SYSTEM

RELATED APPLICATIONS

The present application claims priority of U.S. Provisional application Ser. No. 60/343,748 filed Dec. 27, 2001 entitled "Maintenance of a Calibration Data Base for Position Location Determination of Wireless Mobile Stations," incorporated herein by reference.

BACKGROUND OF THE INVENTION

1. Field of the Invention

This invention relates generally to mobile communications and more particularly to the determination of the positions of wireless mobile stations in a mobile communication network. This invention relates specifically to the maintenance and improvement of a data base used in the determination of the positions of the mobile stations.

2. Description of the Related Art

Mobile communication networks are in the process of offering increasingly sophisticated capabilities for locating the position of a mobile terminal of the network. The regulatory requirements of a jurisdiction may require a network operator to report the location of a mobile terminal when the mobile terminal places a call to an emergency service, such as a 911 call in the United States. In a Code Division Multiple Access (CDMA) digital cellular network, the position location capability can be provided by Advanced Forward Link Trilateration (AFLT), a technique that computes the location of the mobile station (MS) from the mobile station's measured time of arrival of radio signals from the base stations. A more advanced technique is hybrid position location, where the mobile station employs a Global Positioning System (GPS) receiver and the position is computed based on both AFLT and GPS measurements.

Message protocols and formats for CDMA position location employing AFLT, GPS, and hybrid receivers, applicable to both the MS-based and MS-assisted cases, have been published in TIA/EIA standard IS-801-1 2001, Position Determination Service Standard for Dual-Mode Spread Spectrum Systems—Addendum, incorporated herein by reference. Page 4-43 of this standard specifies that each base station shall transmit a GPS reference time correction of the base station antenna transmitting the CDMA pilot pseudorandom (PN) sequence.

Another position location technique is where the measurements are made by a network entity, rather than the mobile station. An example of these network-based methods is the RTD measurement carried out by the base stations. Measurements made by the mobile station may be combined with network-based measurements to enhance the availability and accuracy of the computed position.

Data concerning calibration or re-calibration of a base station time offset, antenna location and other parameters are stored in what is called a "base station almanac." The base station almanac data base provides information for determining an initial position estimate to seed GPS pseudorange searching. The base station almanac data base provides information for resolving ambiguity about which observed pseudorandom noise sequences (PNs) equate to which physical sectors of a GPS-capable IS-95 CDMA network. The base station almanac data base provides the cellular base station sector antenna position from which signals emerge. AFLT range measurements are made to these antenna positions.

Ensuring accuracy and completeness of the base station almanac data base has been a difficult process. Highly skilled people have been required to ensure accuracy and completeness, to diagnose problems, to determine what changes are needed to the base station almanac data base, and to update the base station almanac data base for network changes.

SUMMARY OF THE INVENTION

It has been discovered that minor inconsistencies, incomplete data, or inaccurate data in the base station almanac data base can cause large errors in a position fix. For example, the initial position estimate determination can be thrown off, causing GPS performance degradation. The AFLT solutions can degrade and mixed-cell-positions can be pulled off when sector look-ups are mis-identified or missing. When these errors occur, the performance of the position location determination usually does not simply roll off gradually. Rather, these errors frequently result in dramatic failures. In short, the performance of the position location determination is extremely dependent on accurate and complete information in the base station almanac data base.

It has also been discovered that most cellular operators manage their system in a distributed fashion, such that the group responsible for maintaining the base station almanac data base does not necessarily know of base station almanac data base-affecting changes made by remote field operatives. No automated method to streamline this data integration with integrity checking presently exists. Existing approaches are manual, and thus time consuming and expensive.

It is also desired to maintain more accurate forward link calibration, round trip delay calibration, and their associated uncertainties, in order to improve the accuracy of terrestrial range measurements and obtain more accurate position location determinations.

In view of these problems, a basic aspect of the invention provides several automated techniques that are seamlessly integrated into the wireless network for detecting and solving problems with inconsistent, inaccurate, or incomplete data in the base station almanac data base. These techniques include automatically filling in base station almanac data base record fields with information that is not readily available from cellular operator sources, such as filling in antenna height and cell centroid height using a terrain elevation data base. These techniques also include tracking long term location determination system trends by correlating location determination performance to particular areas or regions, particular cellular infrastructure, and particular handsets.

In accordance with another aspect of the invention, there is provided a base station almanac data base server that shares access to the base station almanac data base with the position determining entity. The base station almanac data base server functions as an interface with network operator personnel to advise them of the possible presence of incomplete or inaccurate data in the base station almanac data base and to advise them of repairs to inaccurate or incomplete data. The base station almanac data base server may also provide the network operator personnel with network data and services other than position calibration data and base station almanac data base maintenance, such as cellular coverage.

In a preferred implementation, for each position location fix, measurement information is sent from a position determining entity (PDE) to the base station almanac data base server. The base station almanac data base server condenses the information to the extent necessary to perform the techniques for detecting and solving problems with inconsistent, inaccurate, or incomplete data, and locally archives a copy of the condensed data. The base station almanac data base server also maintains the "master" copy of the base station almanac data base, from which updates are made periodically to one or more PDEs.

In the preferred implementation, the base station almanac data base server receives base station almanac data base updates from the network operator personnel, and manages the integration of the updated information into the "master" copy of the base station almanac data base, and the forwarding of this updated information to the PDEs. When there is a physical change in the cellular infrastructure or in the cellular infrastructure configuration, the base station almanac data base server maintains records in the base station almanac data base reflecting both the old and new conditions until all of the PDEs are switched over to the new conditions. The base station almanac data base server manages when the new record is removed from each PDE and when the old record is removed from each PDE.

BRIEF DESCRIPTION OF THE DRAWINGS

Other objects and advantages of the invention will become apparent upon reading the following detailed description with reference to the accompanying drawings, in which:

FIG. 4 is a table of measured and optional parameters in a base station record in the base station almanac of FIG. 3;

FIG. 5 is a table of derived parameters in a base station record in the base station almanac of FIG. 3;

FIG. 13 shows various field groups in the base station almanac data base;

FIG. 14 shows a description of cell sector identity information in the base station almanac data base and associated problem detection methodology used by the base station almanac data base server;

FIG. 15 shows a description of antenna position information in the base station almanac data base and associated problem detection methodology used by the base station almanac data base server;

FIG. 16 shows a description of cell sector centroid information in the base station almanac data base and associated problem detection methodology used by the base station almanac data base server;

FIG. 17 shows a description of antenna orientation, antenna opening, and maximum antenna range information in the base station almanac data base and associated problem detection methodology used by the base station almanac data base server;

FIG. 18 shows a description of terrain average height information in the base station almanac data base and associated problem detection methodology used by the base station almanac data base server;

FIG. 19 shows a description of round-trip delay (RTD) calibration and forward link calibration information in the base station almanac data base and associated problem detection methodology used by the base station almanac data base server;

FIG. 20 shows a description of potential repeater and PN increment information in the base station almanac data base and associated problem detection methodology used by the base station almanac data base server;

FIG. 21 shows a description of uncertainty parameters in the base station almanac data base and associated problem detection methodology used by the base station almanac data base server; and FIG. 22 shows a listing of problem detection methods that use an estimate of a cellular handset's position.

Figure 1:
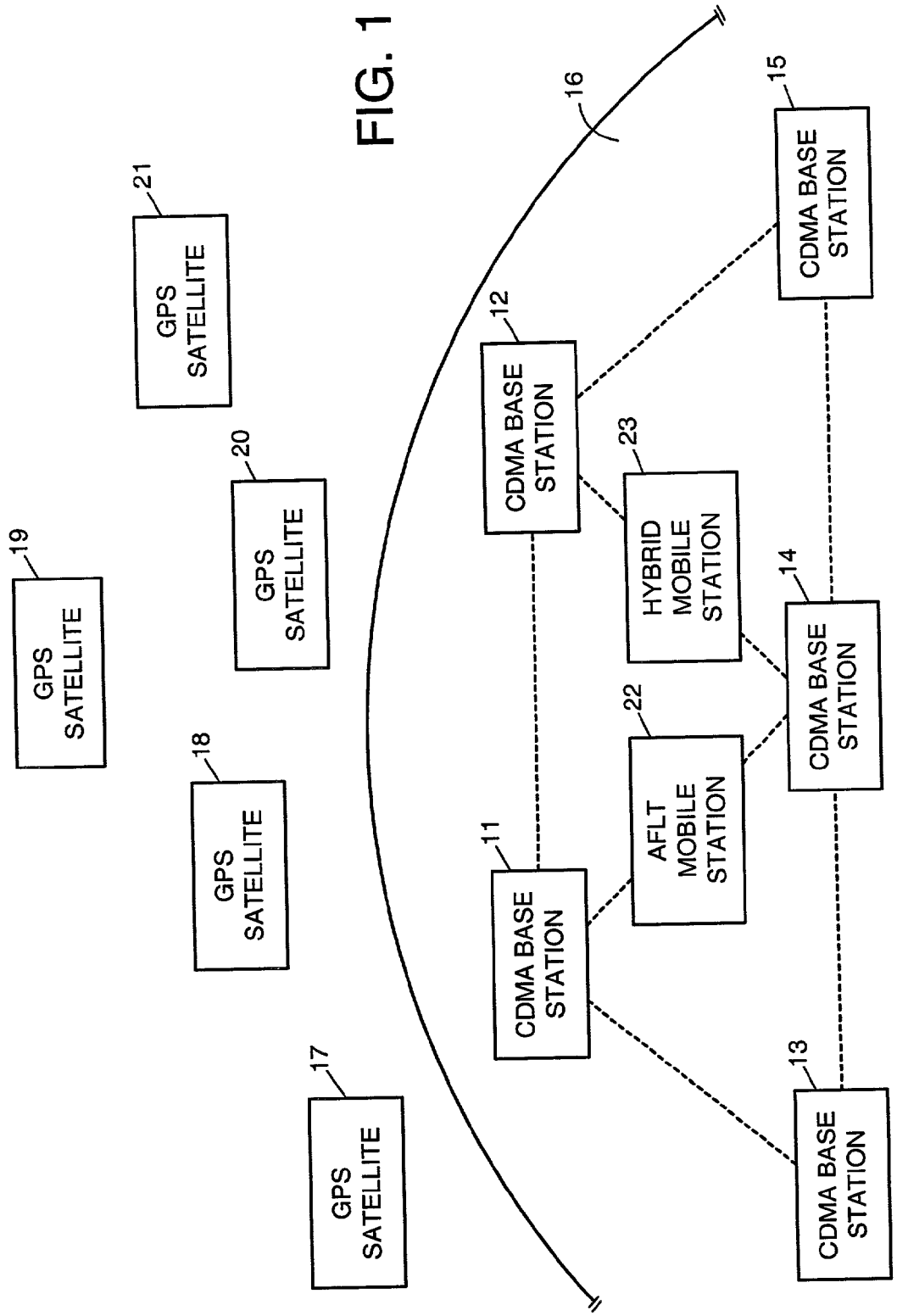
FIG. 1 shows a cellular telephone network using the GPS system for locating mobile telephone units and calibrating base stations.

While the invention is susceptible to various modifications and alternative forms, specific embodiments thereof have been shown by way of example in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

DETAILED DESCRIPTION OF THE INVENTION

FIG. 1 shows a CDMA cellular telephone network using a GPS system for locating mobile telephone units and calibrating base stations. The invention will be described with reference to this example, but it should be appreciated that the invention is not limited to the use of CDMA or GPS. For example, the invention could be practiced in a Time Division Multiple Access (TDMA) cellular telephone network, with or without the use of any kind of global satellite system for assisting position location.

In general, to practice the present invention with any kind of wireless communication network, such as a TDMA cellular telephone network, it is advisable to consult the applicable industry standards for specifications regarding compatible location services. For example, the following detailed description refers to the TIA/EIA standard IS-801-1 2001, Position Determination Service Standard for Dual-Mode Spread Spectrum Systems, which is especially adapted for a CDMA network using AFLT and GPS. The TIA/EIA standard ANSI-136 (System Assisted Mobile Positioning through Satellites) is adapted to TDMA digital PCS systems in the United States. The $3^{rd}$ Generation Partnership Project standards 3GPP TS 04.31 and TS 25.331 Location Services (LCS) (UE position using OTDOA) are adapted to European GSM wireless telecommunication networks.

FIG. 1 shows five CDMA base stations 11, 12, 13, 14, 15 laid out in fixed positions in a hexagonal array on the surface of the earth 16. At about 11,000 nautical miles above the earth, there are at least five GPS satellites 17, 18, 19, 20, 21 in line-of-sight communication with the base stations 11 to 15. Within telecommunications range of the base stations, there are a number of mobile CDMA telephone units 22, 23, which are referred to as mobile stations (MS) in the TIA standards documents cited above. These mobile stations (MS) include AFLT only mobile stations, such as the AFLT mobile station 22, and hybrid mobile stations, such as the hybrid mobile station 23.

The CDMA network is capable of locating the position of the AFLT mobile station 22 and the hybrid mobile station 23 using the well-known AFLT technique of the mobile station measuring the time of arrival of so-called pilot radio signals from the base stations. The time of arrival is indicated by a pilot phase measurement that is relative to the mobile station's time base. Differences of the pilot phase measurements from respective pairs of neighboring base stations are computed in order to eliminate the effect of any time offset in the mobile station's time base. In most cases, each difference locates the mobile station on a particular hyperbola. The intersection of the hyperbolas provides the location of the mobile station.

The CDMA network is also capable of locating the position of the hybrid mobile station 23 using the well-known GPS technique. Each CDMA base station 11 to 15 has a GPS receiver receiving the carrier and pseudorandom code sequence of at least one of the GPS satellites 17 to 21 to provide a CDMA system time base referenced to the GPS system time base. When a hybrid mobile station participates in a position location session with the CDMA network, the serving base station may send GPS acquisition data to the hybrid mobile station. The hybrid mobile station 23 may use the GPS acquisition data to obtain, in about ten seconds or less, a measurement of the pseudorange between each GPS satellite 17 to 21 and the mobile station. In the case of an MS-assisted solution, the hybrid mobile station 23 transmits the pseudorange measurements to the serving base station. As further described below with reference to FIG. 3, a position determining entity (PDE) may compute the geographic location of the hybrid mobile station 23 from four or more of the pseudorange measurements. Alternatively, in the case of an MS-based solution, the geographic location of the mobile station may be calculated by the mobile station itself.

Figure 2:
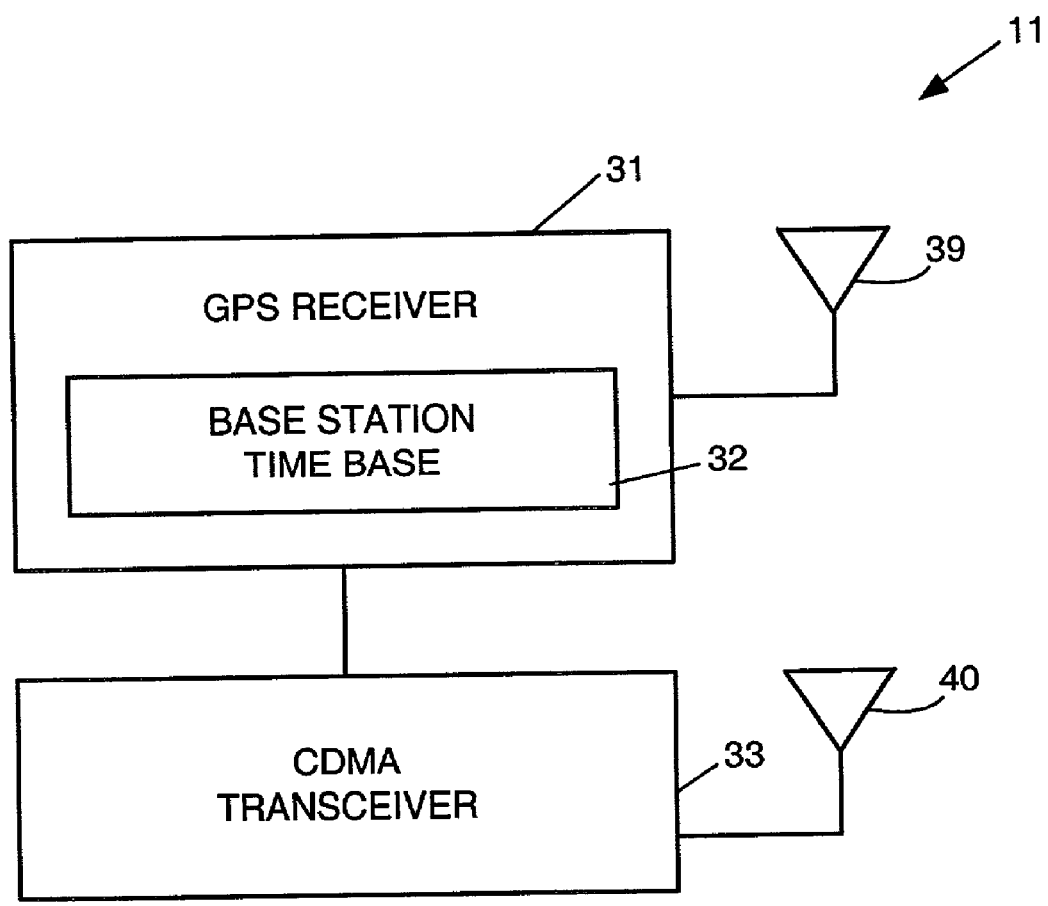
FIG. 2 is a block diagram of a base station in the cellular telephone network of FIG. 1.

FIG. 2 shows the functional blocks in each base station in the cellular telephone network of FIG. 1. Base station 11 includes a GPS receiver 31 providing a base station time base 32 referenced to GPS system time. The GPS receiver 31 obtains signals from a GPS antenna 39. The base station also includes a CDMA transceiver 33 for communicating with mobile stations in the CDMA network. The CDMA transceiver 33 obtains CDMA system time from the base station time base 32. The CDMA transceiver 33 sends and receives wireless signals through a CDMA antenna 40.

Figure 3:
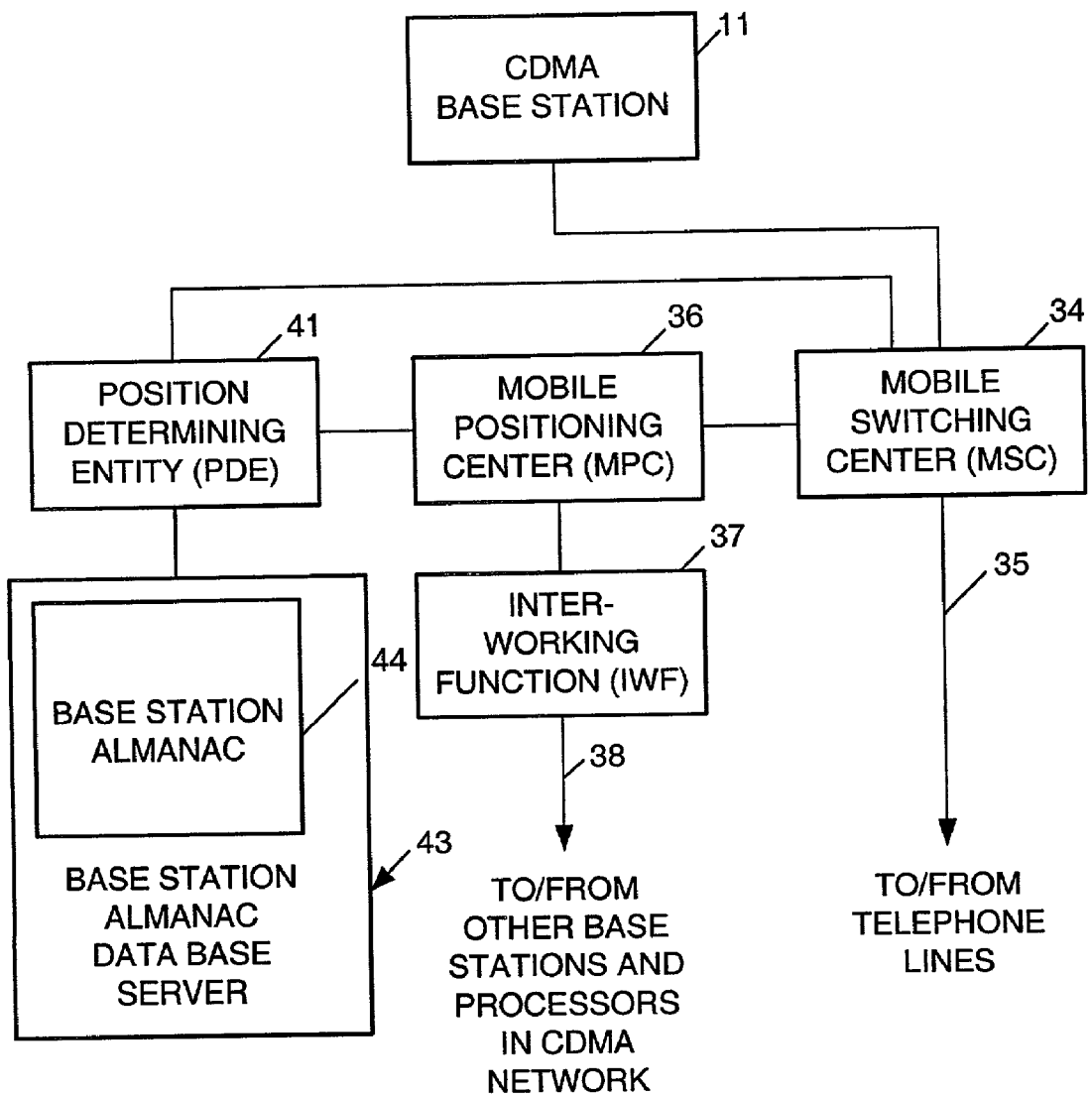
FIG. 3 is a block diagram of stationary components of the cellular telephone network of FIG. 1, including a position determining entity accessing a base station almanac data base.

FIG. 3 is a block diagram of stationary components of the cellular telephone network of FIG. 1. A mobile switching center (MSC) 34 interfaces voice signals and telecommunication data between base station 11 and a number of telephone lines 35, such as copper wires or optical fibers. A mobile positioning center (MPC) 36 is connected to mobile switching center (MSC) 34. The MPC 36 manages position location applications and interfaces location data to external data networks through an interworking function (IWF) 37 and a data network link 38. A position determining entity (PDE) 41 collects and formats position location data. The PDE 41 provides wireless assistance to mobile stations and it may perform position computations. The PDE 41 is connected to the MPC 36 and the MSC 34. The PDE 41 accesses a base station almanac data base 44 that is managed by a base station almanac data base server 43. The PDE 41 and the calibration data base server 43 are implemented, for example, using conventional digital computers or work stations. The base station almanac 44 is stored in the hard disk of the computer for the base station almanac data base server 43, as further described below.

The base station time base (32 in FIG. 2) should be calibrated when the base station is installed or modified. Each base station can have a respective time offset between the GPS system time and the transmission of CDMA signals due to variations in propagation delay or phase shift from the GPS antenna (39 in FIG. 2) to the GPS receiver (31 in FIG. 2), from the GPS receiver to the CDMA transceiver (33 in FIG. 2), and from the CDMA transceiver to the CDMA antenna (40 in FIG. 2). Therefore, to reduce ranging errors in AFLT position determinations and ranging and timing errors in hybrid position determinations, every base station should be calibrated after the base station installation is complete, for example, by storing a time offset for the base station in the base station almanac data base (44 in FIG. 3) for use by the PDE (41 in FIG. 3). Moreover, it is desirable to re-calibrate the base station and update the data base for any subsequent hardware change.

In order to calibrate or re-calibrate the base station, GPS and AFLT position measurement data is obtained from hybrid mobile stations during regular position location sessions when hybrid station users normally engage in telephone calls, or when field service personnel drive around to selected locations and place calls for the purpose of obtaining position measurement data not otherwise obtained from the regular position location sessions. In this fashion, the PDE (41 in FIG. 3) may compute the calibration data internally and store the calibration data in the base station almanac data base (44 in FIG. 3) on a continuous basis. In addition, to alleviate any privacy concerns, the regular position location sessions may occur only when the operator of the hybrid mobile station places or answers a wireless telephone call. In this case, the CDMA system does not determine the operator's position without the operator's knowledge and consent.

In a preferred form of construction, the base station almanac (44 in FIG. 3) includes a record for each base station sector and frequency, and each record includes measured, optional, and derived parameters. The measured and optional parameters are tabulated in FIG. 4, and the derived parameters are tabulated in FIG. 5.

With reference to FIG. 4, the pilot sector name is an optional parameter having a value provided by the wireless operator or the system integrator. The value should be either null or an English-readable and understandable name assigned to make data logging and debugging more efficient.

The system ID corresponds to the SID parameter returned in the MS Provide Pilot Phase Measurement message that is defined in the IS-801 specification *Position Determination Service Standard for Dual-Mode Spread Spectrum Systems* (page 3-38).

The network ID is available through the Wireless Operator Cellular Network Planning data base. The value corresponds to the NID parameter returned in the MS Provide Pilot Phase Measurement message that is defined in the IS-801 specification *Position Determination Service Standard for Dual-Mode Spread Spectrum Systems* (page 3-38).

The extended base ID is available through the Wireless Operator Cellular Network Planning data base. The value corresponds to the following parameters that are returned in the MS Provide Pilot Phase Measurement message that is defined in the IS-801 specification *Position Determination Service Standard for Dual-Mode Spread Spectrum Systems* (page 3-38): BAND_CLASS, CDMA_FREQUENCY, and BASE_ID. These values are further defined and discussed in the IS-95/IS-95-B specifications, TIA/EIA IS-95/IS-95-B.

The transmit PN is available through the Wireless Operator Cellular Network Planning data base. The value is further defined and discussed in the IS-95/IS-95-B specifications, TIA/EIA IS-95/IS-95-B.

The base station antenna position information (latitude, longitude, and altitude) would preferably be of "survey grade" in WGS-84 with an error of less than one meter. Antenna position information is important for performance results relating to the use of AFLT measurements for both initial approximate location determination and final location determination in either purely AFLT or hybrid modes. For example, the MS provides pilot phase measurement data to the PDE. The PDE uses the values provided for or derived from antenna position information to establish the initial approximate location. The presence of large errors in this data could contribute to sub-optimal performance. During final position computations, the PDE will use Pilot Phase Measurement data either alone (AFLT mode), or in combination with GPS (hybrid mode) data. In either case, the antenna location and elevation (height) should be provided to ensure best accuracy.

The antenna location accuracy is interpreted as a 97.1% confidence level (3-sigma) for the three-dimensional position.

Figure 6:
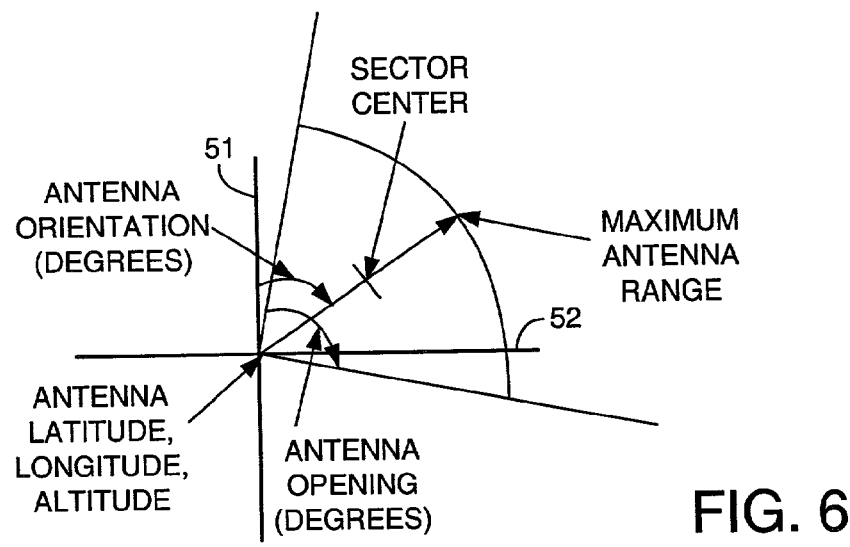
FIG. 6 is a diagram showing the relationship of various parameters associated with a base station antenna.

The antenna orientation indicates the direction, with respect to North, in which the base station antenna is pointed, as further shown in FIG. 6. The value is available through the Wireless Operator Cellular Network Planning data base. Alternatively, the value is determined empirically during a site visit.

The antenna opening is related to the antenna RF footprint in the angular opening, as further shown in FIG. 6. The value is available through the Wireless Operator Cellular Network Planning specifications.

The maximum antenna range is such that for 99% of MS session minutes served by this BS, the MS is within this distance from the BS antenna position. For good system performance, this value is the minimum range necessary to cover 99% of MS session minutes. Antenna pattern and BS transmitter power are taken into account when modeling this parameter. Reasonable assumptions for signal obstructions are used. This model also accounts for the probability that a call would be served by other nearby base stations. It may be challenging to take adequate field data to precisely determine this parameter, so steps are taken to use the information with an appropriate degree of uncertainty in the PDE.

Terrain average height and height standard deviation is obtained from a high quality digital terrain elevation mapping database that is accessed once offline to populate these fields. Terrain Height (or elevation) statistics are determined for the geographic region that is served by the given sector, as described further below with reference to FIG. 7.

The RTD calibration has a value determined by an onsite empirical measurement. If RTD is not supported by the operator infrastructure, then the RTD parameters are optional. If RTD is supported, the RTD calibration accuracy is estimated as a 99.7% confidence value (3-sigma).

The FWD link calibration has a value determined by onsite empirical measurement. The FWD calibration accuracy is estimated as a function of the FWD link calibration procedure and interpreted as a 99.7% confidence value (3-sigma).

If the transmitter being described by the almanac entry is not a repeater, then the potential repeater parameter is used to indicate the potential existence of repeaters. The potential repeater parameter is set to zero if the transmitter is not used with a repeater, and set to one if the transmitter is used with one or more repeaters for relaying the transmitter's signal.

If the transmitter being described by this almanac entry is a repeater, then the potential repeater parameter is set to a value indicating a unique repeater ID (greater than 1). If there is more than one repeater associated with a given sector, and if any repeater information is to be provided for that BS, then there is a unique base station almanac record for all of the repeaters, and the potential repeater field is used as a counter. In other words, the first repeater would have a potential repeater value of 2, the second repeater would have a potential repeater value of 3, and so on. (A potential repeater value of 1 is reserved for BS information, indicating that repeaters exist for the BS.)

The PN increment parameter has a value indicating the highest common factor of the PN offset of this sector and all other offsets that are in the vicinity and on the same CDMA frequency. Many networks use a fixed increment, such as 2, 3, or 4. Near the boundary of two networks, it is very important that the highest common factor of the network-design PN increment values be used for all BS almanacs in the vicinity, because they may hear a BS from the neighboring network. In networks where the increment may be smaller than 3, care should be taken to make this parameter reasonably accurate, based upon network models. This information is used to help the PDE resolve potential ambiguities between different pilots in the same general vicinity. If it is set too small (for example, to 1 when the true value is 2), the PDE may need to "throw out" measurements that would otherwise be usable. If it is set too large, the PDE may report erroneous locations.

The format type parameter has a value of one to indicate that the format shown in FIGS. 4 and 5 is used for the almanac entry, and other values may be used to indicate that other formats are being used.

The MSC switch number is an optional parameter. The value is available through the Wireless Operator Cellular Network Planning data base. The value should correspond to the MSC Switch Number parameter that is sent to the PDE in the Switch Number portion of the MSCID field that is defined in various J-STD-036 messages, especially including the GPOSREQ message. (See the *Enhanced Wireless 9-1-1 Phase 2* J-STD-036 specification and ANSI-41-D reference within.) In some implementations that do not require the use of J-STD-036 to communicate with the PDE, the MSC switch number is not needed. If the MSC switch number is not needed, then it should be set to the value −1.

With reference to FIG. 5, the sector center latitude, longitude, and altitude are computed using the following measured parameters: antenna latitude, antenna longitude, antenna altitude, antenna orientation, antenna opening, and maximum antenna range. These measured antenna parameters are depicted in FIG. 6, where the axes 51, 52 correspond to the antenna latitude and longitude, respectively. The sector center is used for calculating GPS acquisition assistance when the initial approximate position cannot be determined using pilot phase measurements. Such information is important for minimizing the potential GPS search space. The sector center information can also be used as a starting point for an iterative navigation solution.

It is desired for the sector center to be the average location of the mobile stations within the base station sector antenna coverage area. In this case, the sector center can initially be set to an estimate based on the directionality of the antenna, and this estimate can be improved for each determination of position of a mobile station in communication with the base station. For an omni-directional antenna, for example, the sector center is initially set to the latitude and longitude of the base station antenna, and the terrain elevation at the base station antenna, or the terrain average height. For a directional antenna having a narrow beam width, the sector center is initially set to the latitude and longitude at about thirty percent of the maximum antenna range from the antenna, and the terrain elevation at the base station, or the terrain average height. Each time the position of a mobile station is determined within the sector, a new value of the sector center is computed as a weighted average of the old value and the position of the mobile station, for example, according to:

$$SectorCenter[i]=\alpha(MobilePosition[i])+(1-\alpha)(SectorCenter[i])$$

where [i] is an index having a value indicating the latitude, longitude, or height position coordinate, $\alpha$ is a weighting factor equal to 1/(MIN+NMP), MIN is a predetermined number, such as 100, representing an estimate of the weight of the initial estimate, and NMP is the number of mobile position determinations having been made in the cell sector.

The sector terrain average height and terrain height standard deviation parameters have values that are derived from either accurate terrain elevation maps or other direct, empirical methods. These values are used by the PDE as elevation aiding information. Such information corresponds to an additional degree of freedom available to the final position determination calculations. Accurate elevation aiding information is valuable as an additional GPS satellite or Pilot Phase Measurement, for improving yield and accuracy.

A total of four measurements are needed to produce a location fix, which can come from GPS ranges, AFLT ranges, or the surface of the earth. With an accurate sense of the altitude in a given region, the surface of the earth can be used as an additional measurement in the navigation solution. This means that one fewer GPS or AFLT range measurement is required, significantly improving yield in challenging environments. A total of four measurements are required, so if altitude were available, only three measurements would produce a fix.

The terrain height standard deviation parameter defines the 1-sigma error associated with this value. It should reflect the variability of the terrain within that sector's coverage region, plus any variability due to tall buildings. Both terrain height parameters are in meters, and terrain average height reflects height above ellipsoid (HAE) (as opposed to mean sea level).

Figure 7:
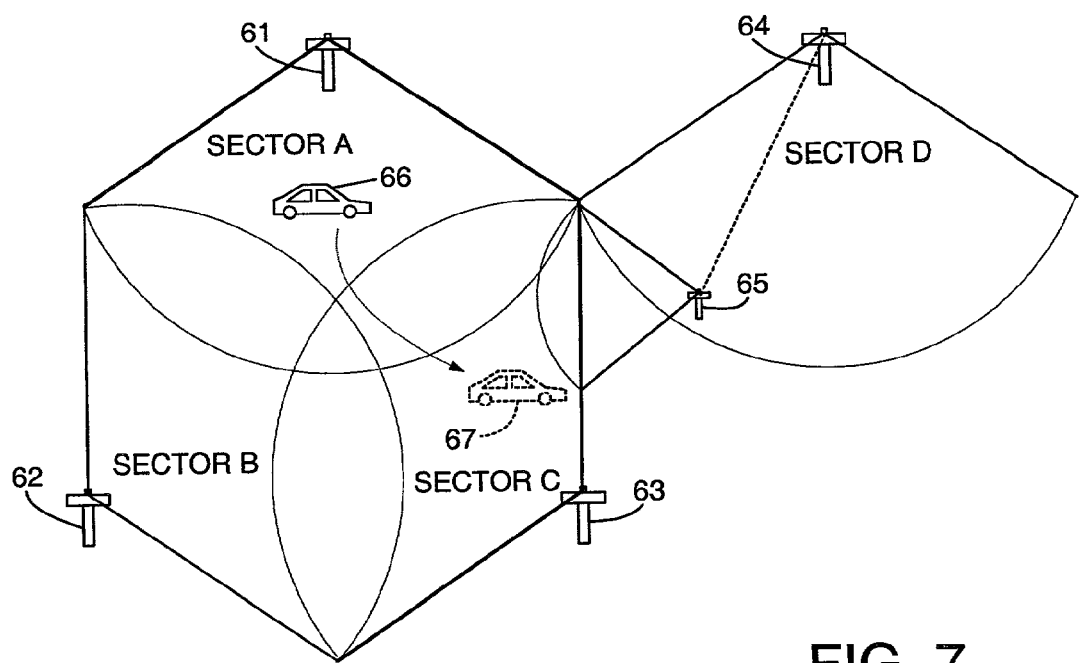
FIG. 7 is a cell coverage map including a number of cell sectors.

FIG. 7 shows respective cell sector coverage areas (Sector A, Sector B, Sector C, and Sector D) for base station antennas 61, 62, 63, and 64. A repeater 65 extends the coverage area of the base station antenna 64. Perhaps even before the beginning of a fix process, just before the mobile 66 enters the traffic channel, the sector identity information is recorded. Some time thereafter, with the mobile 66 in the communications state, the mobile begins to make a location fix. The mobile 66 notes the current PN number and sends it along with the recorded sector identity information to the PDE in an IS-801.1 message. Note that the mobile 66 may have handed off to sector different from the sector at which the sector identity information was recorded; for example, the mobile has handed off from Sector A to Sector B when the mobile reaches the position 67 shown in dashed line representation. In this case, the current PN number and the sector identity information may belong to different cells. The sector identity information belongs to the serving sector, while the PN number belongs to the reference sector. Note also that PNs are not unique and typically repeat many times within any cellular network.

Also sent in this initial IS-801.1 message are sectorrange measurements seen by the mobile at that time, including the reference sector and possibly other sectors. These are identifiable only by PN number, and are known as measurement sectors. Note that the reference sector, and the serving sector if still seen, are also measurement sectors. These range measurements are used to generate a coarse position, known as a prefix, which uses AFLT measurements only and is typically less accurate than the final fix performed later.

The purpose of the prefix is to generate a more precise initial position estimate, which enables more accurate GPS assistance information than would be possible using only knowledge of the reference sector. More accurate GPS assistance information improves GPS accuracy and yield, and reduces processing time. The prefix is optional, and if for whatever reason it is not available, an initial position estimate based on the reference sector is used.

After GPS assist information is sent to the mobile, the mobile collects a second set of AFLT measurements and a set of GPS measurements, known as the final fix. Since PN numbers are not unique, the PDE must resolve which PN number seen belongs to which physical sector. This is not as easy as it sounds, since sectors with the same PN number are often spaced as close as 8 km from each other or even closer. This spacing is used to determine the reference sector from the serving sector, and the measurement sectors from the reference sector. Only cells within a distance threshold are considered. The distance threshold is determined by scaling the Max Antenna Range parameter of the BSA.

If no sectors with the target PN and frequency are found, the lookup fails. Likewise, if more than one sector with the target PN and frequency are found and the PDE is unable to determine which one is the real one, the lookup fails. If one sector with the target PN is found, then the lookup is successful, and that sector is presumed to belong to the PN observed. If a lookup fails when trying to determine the reference sector from the serving sector, then the serving sector is presumed to be the reference sector. If a lookup fails when trying to determine a measurement sector from the reference sector, then that measurement PN is not usable and is ignored. If the sector identity information is not found in the BSA at all, then a GPS fix is attempted using default initial position estimate information stored in the PDE's configuration file or registry.

It is also possible to make an initial position estimate based on Network ID/System ID and coverage area centroids. In this method the PDE automatically determines a position and uncertainty for the coverage area of all the cells with each unique Network ID and System ID by examining all the sectors in the BSA. This information serves several purposes. If no better initial position estimate is available, the Network ID/System ID position and uncertainty can be used. This would happen, for example, when the sector identity information seen by the MS is not found in the BSA. Note that the initial position estimate will have much higher uncertainty in this case, which can reduce GPS accuracy and yield, and will result in longer MS processing times. If all better methods for determining final fix position are not available, the Network ID/System ID centroid position and uncertainty will be reported.

In short, GPS and AFLT position measurement information from hybrid mobile stations can be combined to generate pseudorange offsets and base station time base offsets. In addition to providing base station time base offsets for base station calibration, the pseudorange offsets at various physical locations in the wireless coverage area, such as for various cell sectors, can be compiled and used for correction of position fixes of mobile stations determined to be in the vicinity of the cell sectors. For example, the distance correction is quantified as a forward link calibration value (FLC). In particular, the FLC is defined as the time difference between the time stamp on the data being transmitted by the mobile station and the actual transmission time.

The components that contribute to the FLC are cable delays of the base station GPS receive antenna, the GPS receiver timing strobe output to base station transmit hardware timing strobe input, and the base station transmit antenna. The data base calibration server automatically adjusts the FLC fields in the base station almanac data base based on the GPS and AFLT position measurement data from the hybrid mobile stations. By using the more accurate FLC values for sectors, the range measurements can be improved from about 0 to 30 percent.

Since GPS pseudoranges are so much more accurate, if a sufficient number of GPS satellites are seen, the final reported fix would be based almost exclusively on GPS. Fortunately, in these cases, the distance estimates to the sector antennas are still measured and saved in PDE log files. Thus all the information needed to determine the new calibrated FLC value is available. This information includes: the old "default" or "average" FLC value; the fix position, determined using GPS measurements, the sector antenna position from the base station almanac data base, and the measured distance estimate to each cell sector antenna, determined using pilot phase measurements with the AFLT technique. The following equation relates these inputs to the new FLC value:

$$New\_FLC = Old\_FLC - (distance\_from\_fix\_position\_to\_antenna - measured\_distance\_estimate)$$

The above equation omits units conversion constants. For example, if FLC is measured in so-called pseudorandom number Chip_x_8 units, the formula for the new FLC value is:

$$FLC_{NEW} = FLC_{OLD} + \frac{Residual}{30.52}$$

where:

$FLC_{NEW}$=the new Forward Link Calibration value, in Chip_x_8 units $FLC_{OLD}$=the Forward Link Calibration value used during the PDE collect, in Chip_x_8 units Residual=the residual for a specific sector pseudorange measurement, in meters, which is what emerges from the PDE if ground truth is not known 30.52=the number of meters per Chip_x_8 unit.

A key to adjustment of the FLC is that the position fix should be of high accuracy, since any fix position error would translate into error in the new FLC value. Fix position can be assessed with high confidence using a "Horizontal Estimated Position Error" (HEPE) quality measure, which is the PDE's own estimate of the error of each location fix. Thus, only fixes that meet some quality threshold—such as having a HEPE value of less then 50 meters—should be used for these calculations.

Pilot measurements are calculated to all sectors heard by the handset with each fix. Depending on the environment, this is usually at least a modest handful of sectors, and often as many as 20 or more in dense urban environments. Thus each fix results in many distance estimates, all of which are useable in this process.

An initial base station almanac data base should exist in this process so that the PDE can resolve the sector identity of each sector seen. However the quality of the FLC values for these sectors is not as important. "Default" or "average" values of FLC can be used. The key is that the sector identities seen by the handset exist in the base station almanac data base. It is desired for the antenna positions to be reasonably accurate, but the antenna positions do not need to be known precisely at any time. If understanding of an antenna position improves over time, this can be factored in to obtain an antenna position of greater certainty, and used to improve the forward link calibration accuracy. In addition, the base station almanac data base server can determine if an antenna has been moved, and in this instance, a precise but outdated antenna location can be removed from the base station almanac data base and replaced with an updated location.

Figure 8:
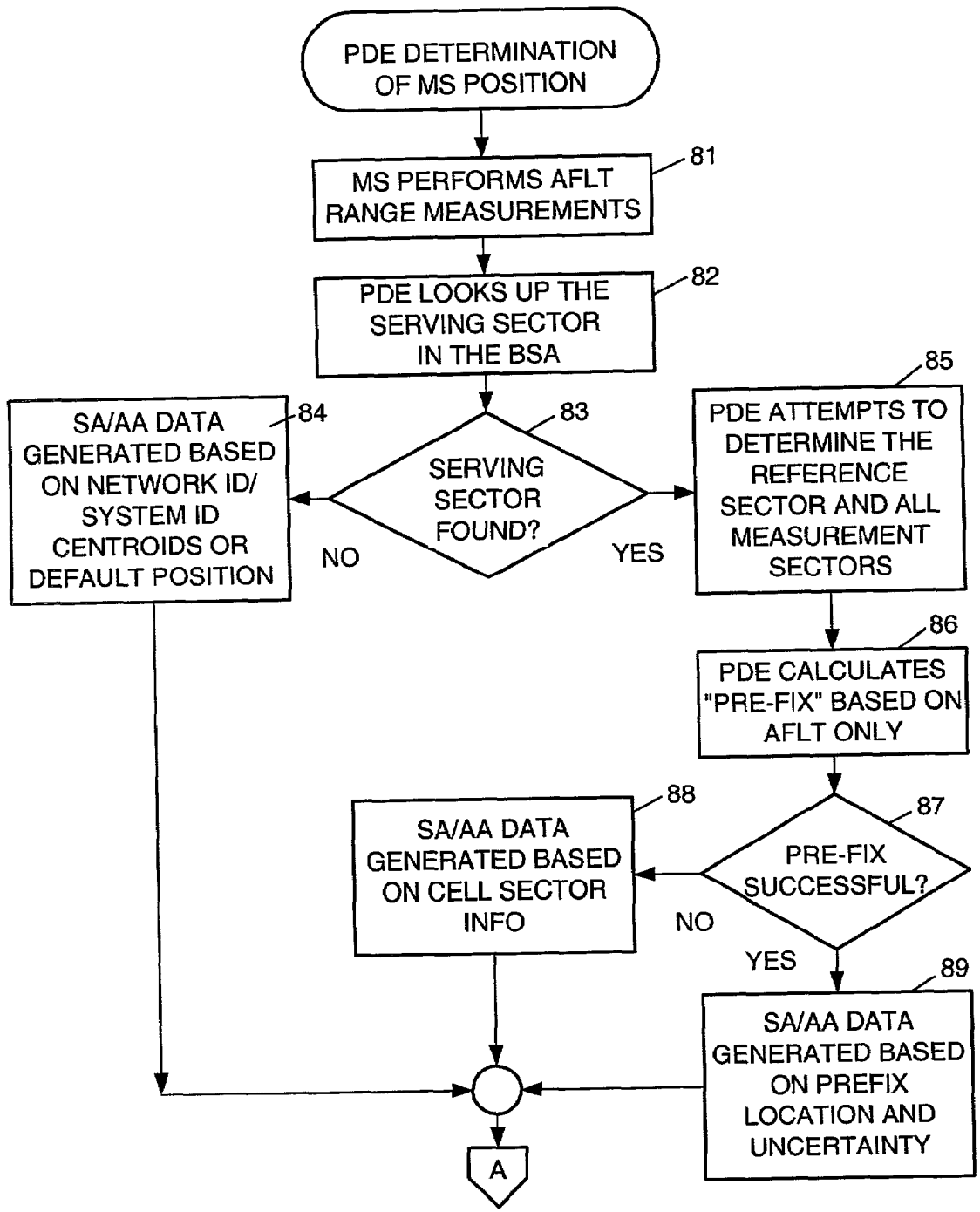
FIGS. 8 and 9 comprise a flowchart showing how a position determining entity determines the position of a mobile station.
Figure 9:
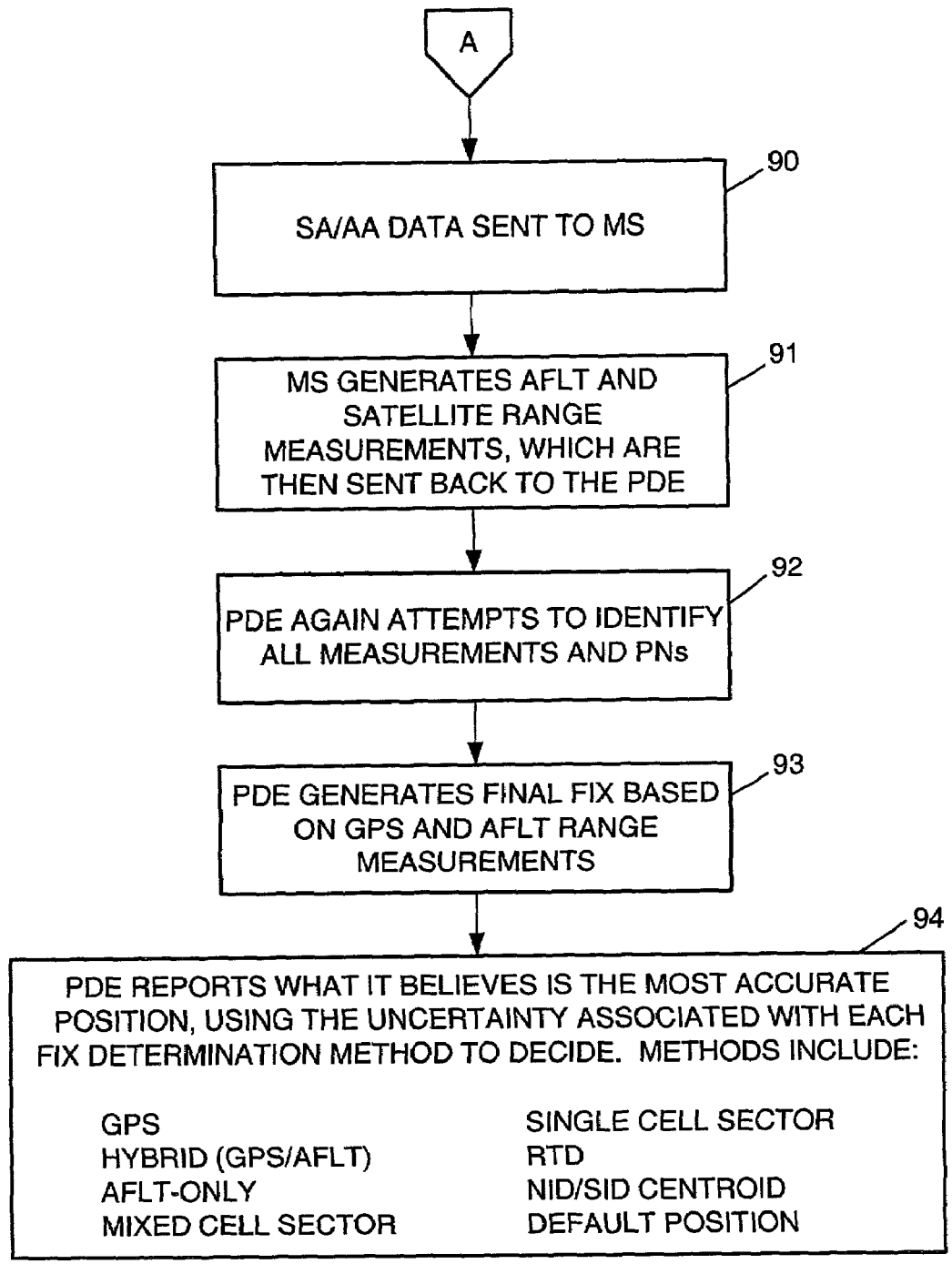

FIGS. 8 and 9 show an example of how the PDE can be programmed to determine the position of a mobile station. In the first step 81 of FIG. 8, the PDE makes an initial position estimate based on AFLT measurements sent initially from the MS to the PDE. In step 82, the PDE attempts to associate the PNs seen by the mobile stations with specific cell sectors recorded in the base station almanac data base. If the sector that is serving the MS can not be uniquely identified, then AFLT is not possible since the PDE is not able to determine from which base station antenna towers the AFLT range measurements originate. Therefore, execution branches from step 83 to 84 if the sector that is serving the MS cannot be uniquely identified. Otherwise, execution continues from step 83 to step 85.

In step 84, Sensitivity Assist (SA) and Acquisition Assist (AA) data is generated based on network ID or system ID centroids or default position. The SA/AA data will be sent to the MS (in step 90 of FIG. 9) in order to aid the MS in GPS acquisition and GPS pseudorange measurement. Because the serving cell has not been found, AFLT is not possible, and GPS accuracy and yield may be seriously impaired. Execution continues from step 84 to step 90 of FIG. 9.

In step 85 of FIG. 8, the PDE attempts to determine the reference sector and all measurement sectors. If a measurement PN cannot be uniquely associated with a single sector, that range measurement is not used. If the reference cell cannot be uniquely determined, the serving cell is used in its place. Next, in step 86, the PDE calculates a "pre-fix" based on AFLT only. Then in step 87, execution branches to step 89 if the "pre-fix" calculation of step 86 was not successful. Otherwise, execution continues from step 87 to step 88.

In step 88, SA/AA data is generated based on cell sector information. Execution continues from step 88 to step 90 of FIG. 9.

In step 89 of FIG. 8, SA/AA data is generated based on the pre-fix location and uncertainty. The smaller the initial position uncertainty, the more precise the AA data, the faster the processing in the MS will be, and the better final fix accuracy and yield. Execution continues from step 89 to step 90 of FIG. 9.

In step 90 of FIG. 9, the SA/AA data is sent to the MS. The MS uses the SA/AA data for GPS acquisition and GPS pseudorange measurement. The MS searches for the GPS satellites indicated in the assist data, and perform a second round of searching for AFLT pseudoranges. In step 91, the PDE receives from the MS the GPS and AFLT pseudoranges. In step 92, the PDE again attempts to identify all measurement PNs. If a PN cannot be uniquely identified with a single sector, then that range measurement is not used. In step 93, the PDE generates a final fix based on the GPS and AFLT range measurements.

In step 94, the PDE may use several methods in parallel to calculate the final position, and the approach most likely to achieve the least position error is used. A GPS fix is attempted first, because accuracy is far superior to any other method. If the GPS fix fails, the PDE select from among several other approaches, and the result with the smallest associated error estimate is used. These other approaches include: AFLT-only; a position determined by knowing the sector orientation and the approximate range using an RTD measurement (where available); a "mixed cell sector" fix determined using knowledge of the sectors seen by the mobile, and each sectors' position and orientation; a current serving sector coverage area centroid position determination (or if it was not possible to determine the current serving sector, the original serving sector); the centroid position of the current Network ID/System ID coverage region; and finally a default position stored in the PDE's configuration file.

The use of an FLC for each sector to correct the position of an MS in the vicinity of the sector can be improved by the accumulation and statistical analysis of multiple distance estimates to various mobile stations in each sector, preferably from diverse locations within the sector coverage area. By gathering a sample set, statistical processing on the set can be applied to determine the most optimal new FLC value to use. Averaging this data, and using data collected from a diverse set of locations within each sector's coverage area, has been found to yield more accurate FLC values.

A sample set can be gathered from regular position location sessions during normal telephone calls to or from hybrid mobile stations, and/or from drive-around field collection. For additional quality of the collected data, the drive-around field collection can be performed by technical field personnel in vehicles each equipped with a hybrid mobile handset linked to an external PCS antenna and an external active GPS antenna. In areas where multiple CDMA frequencies are in use, data should be collected on each frequency, since each sector-CDMA-frequency permutation is calibrated separately. For example, when using a drive-around approach, multiple handsets should be used to ensure sufficient frequency diversity.

Figure 10:
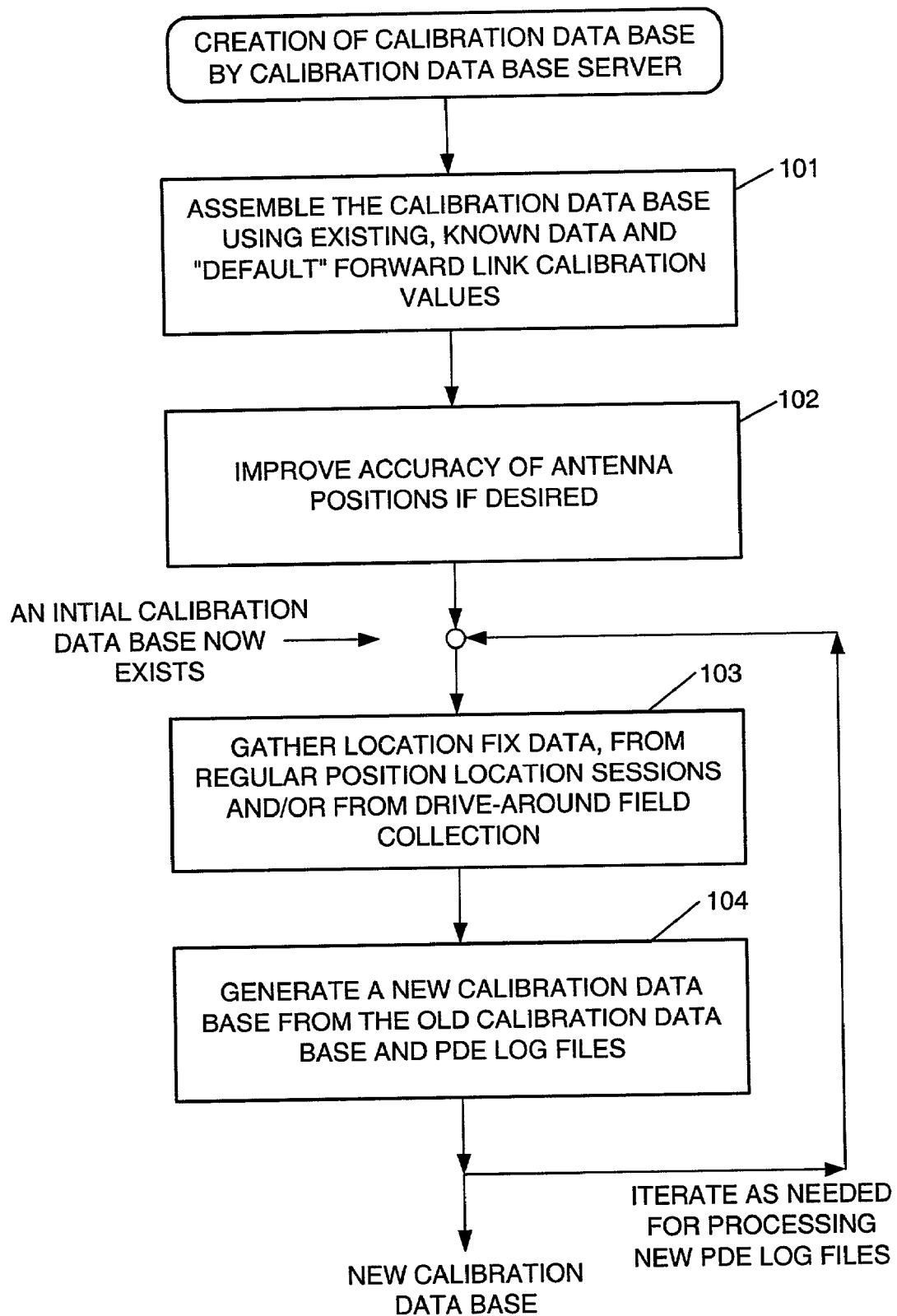
FIG. 10 is a flow chart of a procedure used by a base station almanac data base server to create a base station almanac data base.

FIG. 10 shows a flow chart of how the base station almanac data base server creates a base station almanac data base. In a first step 101, the base station almanac data base server assembles an initial base station almanac data base using existing, known data and "default" forward link calibration values. This information includes the cell sector identity information (Network ID, System ID, Extended Base Station ID, PN number, etc.), the sector antenna position latitude/longitude/height, and information about the coverage area of this sector. The "default" forward link calibration value can be obtained or estimated from experience with similar infrastructure equipment, or by calibrating a small test region, which uses the same infrastructure equipment. In an optional second step 102, the accuracy of antenna positions can be improved if desired by collection of more precise antenna position measurements. After step 102, an initial base station almanac data base has been created.

In step 103, location fix data is gathered, from regular position location sessions, and/or from drive-around field collection, as introduced above, and location fix computations are performed by the PDE. Then in step 104 the base station almanac data base server generates a new base station almanac data base, including new FLC values, from the old base station almanac data base and the location fix data from the PDE log files. Steps 103 and 104 are iterated as needed for processing new PDE log files, so that the base station almanac data base is adjusted over time in accordance with various changes in the wireless network, the network equipment, and in the network environment. In fact, steps 103 and 104 can be iterated over time using different PDEs and different base station almanac data base servers.

Analysis of the location fix data sets is also useful in determining other parameters in the base station almanac data base, such as the "Maximum Antenna Range" (MAR). For example, the base station almanac data base server adjusts MAR to satisfy two goals. First, MAR should be large enough such that 99% of mobile units using a particular base station are within the MAR of the antenna and 100% within 2*MAR. Second, MAR should be small enough such that two base stations with the same PN and frequency should never have overlapping MARs. Proper adjustment of MAR results in better base station lookup success in the PDE and better GPS Acquisition Assist windows.

The base station almanac data base server uses a similar process for determining the new MAR as it does for the new FLC. Each fix in the measurement file is reviewed to see if it is "good enough". Measurements are used for determining a new MAR if they meet all of the following default criteria: a successful position fix by GPS or HYBRID or AFLT method, a fix HEPE of less than 500 meters, and a measurement residual of less than 300 meters.

In addition to FLC and MAR, the base station almanac data base server calculates FLC uncertainty values, cell sector centroid positions, terrain average height and standard deviation using a terrain elevation database.

Figure 11:
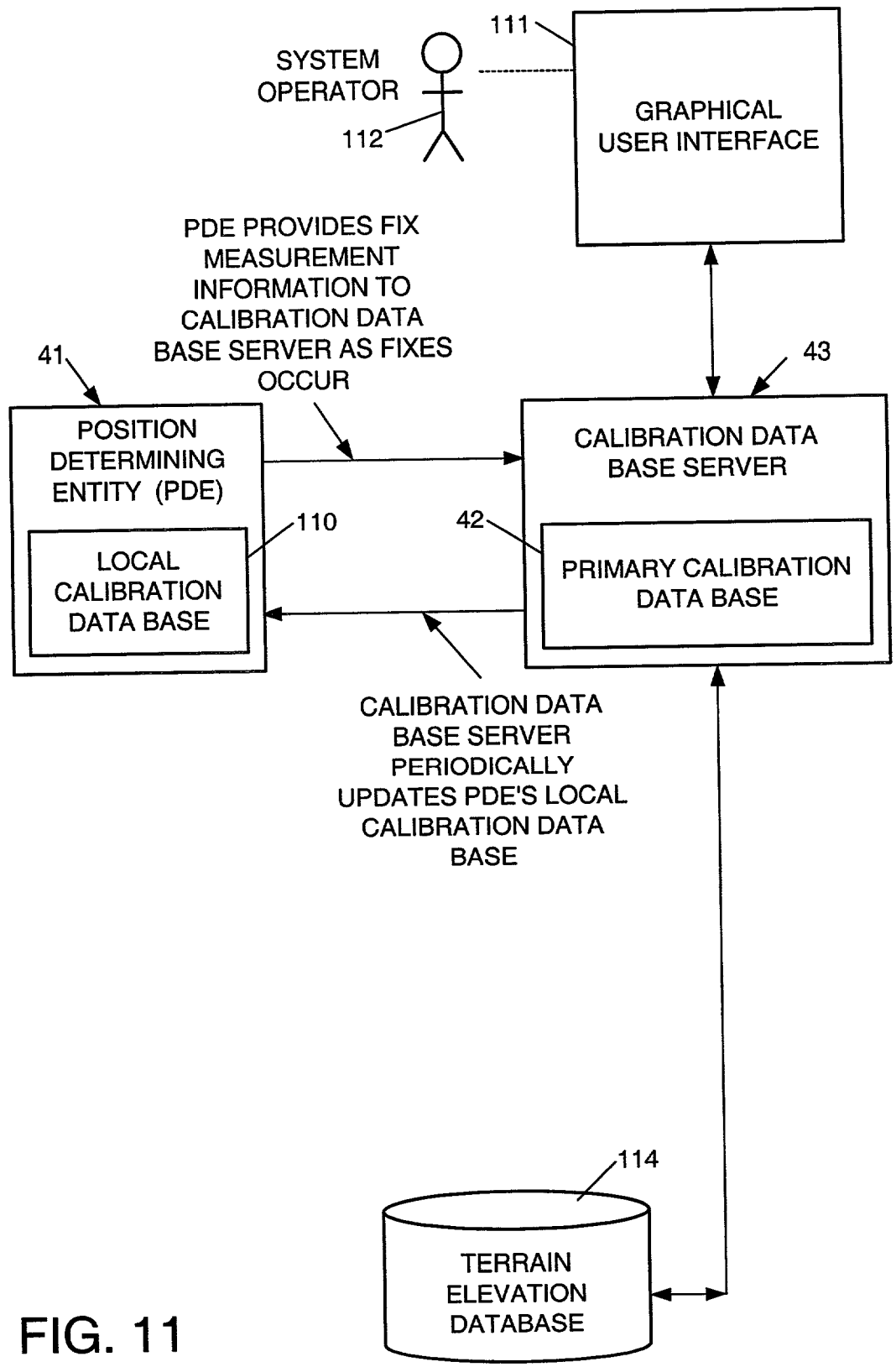
FIG. 11 is a block diagram of a specific configuration for the base station almanac data base server.

FIG. 11 shows an example of specific configuration for the base station almanac data base server 43. The base station almanac data base server 43 maintains a "master" or primary copy of the base station almanac data base 44, from which updates are made periodically to a local base station almanac data base 110 in a PDE 41. It is also possible for one base station almanac data base server to service more than one PDE, where each PDE services a respective base station. For each position location fix, measurement information is sent from the PDE 41 to the base station almanac data base server 43. The base station almanac data base server condenses the information to the extent necessary to perform the techniques for detecting and solving problems with inconsistent, inaccurate, or incomplete data, and locally archives a copy of the condensed data.

The base station almanac data base server 43 also has a graphical user interface 111 to advise a system operator 112 of the possible presence of incomplete or inaccurate data in the primary base station almanac data base 44 and to advise of repairs to inaccurate or incomplete data. The base station almanac data base server may also provide the system operator 112 with network data and services other than position calibration data and base station almanac data base maintenance, such as cellular coverage maps and analytical analysis.

The base station almanac data base server 43 also receives base station almanac data base updates from the system operator 112, and manages the integration of the updated information into the primary copy of the base station almanac data base 44, and the forwarding of this updated information to the PDE 41. When there is a physical change in the cellular infrastructure or in the cellular infrastructure configuration, the base station almanac data base server 43 maintains records in the base station almanac data base reflecting both the old and new conditions until all of the PDEs serviced by the base station almanac data base server 43 are switched over to the new conditions. The base station almanac data base server 43 manages when the new record is removed from each PDE and when the old record is removed from each PDE. The base station almanac data base server also maintains PDE performance tracking information 113 and a terrain elevation database 114.

Figure 12:
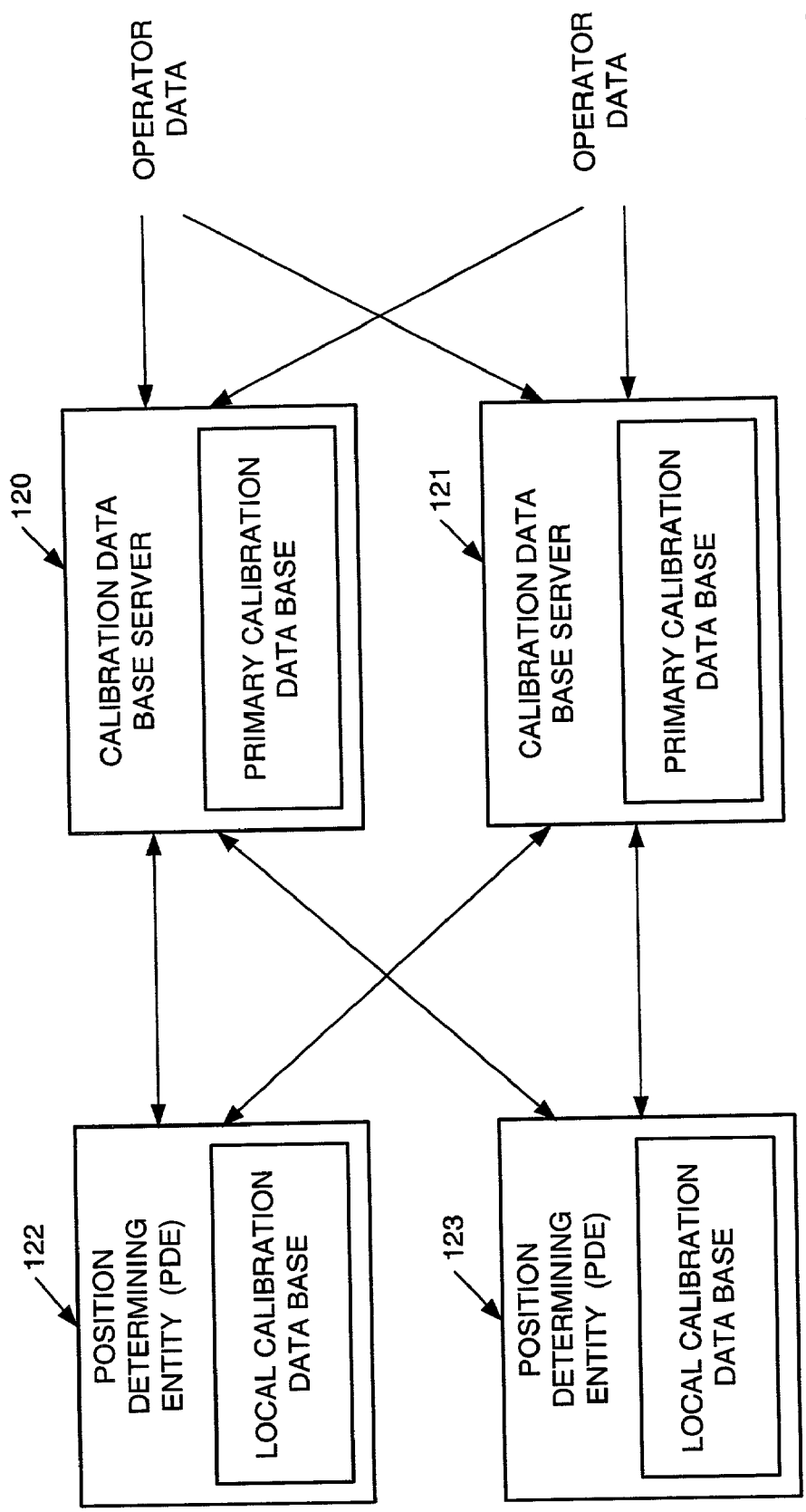
FIG. 12 is a block diagram of a redundant configuration of position determining entities and base station almanac data base servers.

FIG. 12 shows that one base station almanac data base server 120, 121 can support multiple PDEs 122, 123, and multiple base station almanac data base servers 120, 121 can simultaneously support multiple PDEs 122, 123 for full redundancy.

FIG. 13 shows various field groups in the base station almanac data base. The field groups include: cell sector identity information (in IS-95: Network ID, System ID, Switch Number, Extended Base Station ID, plus PN); pilot sector name; antenna position latitude, longitude, and altitude (height above ellipsoid); cell sector centroid position—latitude, longitude, and altitude (height above ellipsoid); antenna orientation; antenna opening; maximum antenna range (MAR); terrain average height; RTD calibration; FWD link calibration; potential repeater; PN increment; and uncertainty parameters (e.g., accuracy or standard deviation).

RTD calibration is the calibration of the base station receive chain relative to GPS time. Factors that affect this calibration are the base station GPS cable length, GPS receiver delays, base station receiver antenna cable length, and base station receiver processing delays.

FIG. 14 shows a description of the cell sector identity information and the problem detection methodology that the base station almanac data base server employs with respect to this information. The cell sector identity information is the key to relating signals observed by a handset (i.e., a wireless mobile station) to information in the base station almanac data base. The cell sector identity information in particular must be complete and accurate, and must be free of duplication or error for good location determination performance. New or modified cellular infrastructure or cellular infrastructure configuration changes, result in cell sector identity changes. Such changes are frequent.

The base station almanac data base server discovers all instances where an identity observed by a handset is not found in the base station almanac data base, and track such occurrences over time. The base station almanac data base server identifies new sectors that are added to the network, and advises the system operator of such changes. The base station almanac data base server generates a base station almanac data base entry including determination of the antenna location, the observed identity, calibration and uncertainty parameters calculated automatically, and default values. The base station almanac data base server also identifies sectors whose identity observed by the handset or reported by the cellular infrastructure has changed due to a network change or reconfiguration and no longer matches the base station almanac data base. The base station almanac data base server automatically alters the base station almanac data base to reflect the new identity.

FIG. 15 shows a description of the antenna position information and the problem detection methodology that the base station almanac data base server employs with respect to this information. For terrestrial range measurements, the antenna position helps the PDE to resolve the reference sector and measurement sector identities, and is the location from where the range measurements originate. Antenna position errors translate to terrestrial range errors. Antenna position is also essential in generating an "initial position estimate", which is used to generate GPS assist information.

The base station almanac data base server identifies base station almanac data base sector antenna positions that are not consistent with the measured position. This can result from mobile cells (COWs and COLTs) or from typos in the base station almanac data base. The base station almanac data base server advises the system operator of such problems, and if so configured, the base station almanac data base server will automatically fix the problems.

FIG. 16 shows a description of the cell sector centroid information and the problem detection methodology that the base station almanac data base server employs with respect to this information. Sector centroid position is returned as the result when more accurate location determination methods fail. Also, sector centroid position is also essential in generating an "initial position estimate", which is used to generate GPS assist information. The cell sector centroid is one of the parameters that helps the PDE understand the sector coverage area. Knowledge of the sector coverage area is key to successfully relating observed terrestrial signals to an entry in the base station almanac data base.

The base station almanac data base server maps the sector coverage area based on MS location sessions and thus the most optimal cell sector centroid position is updated over time. The base station almanac data base server also updates the base station almanac data base with the most optimal cell sector position.

FIG. 17 shows a description of the antenna orientation, antenna opening, and maximum antenna range information, and the problem detection methodology that the base station almanac data base server employs with respect to this antenna information.

The antenna orientation is the direction in which the cell sector antenna is pointed. Antenna orientation is often used to determine the approximate sector coverage region and sector centroid position with off-line tools. The base station almanac data base server maps the sector coverage area and determines the most optimal antenna orientation over time, and updates the base station almanac data base with the optimal antenna orientation.

The antenna opening (beam width) is often used to determine the approximate sector coverage region and sector center position with off-line tools. The base station almanac data base server maps the sector coverage area and determines the most optimal antenna opening over time, and updates the base station almanac data base with the optimal antenna opening.

The maximum antenna range (MAR) is the key parameter used by the PDE to quantify the sector coverage area. Knowledge of the sector coverage area is key to successfully relating the observed terrestrial signal to an entry in the base station almanac data base. The base station almanac data base server maps the sector coverage area and determines the most optimal MAR over time, and updates the base station almanac data base with the optimal MAR.

FIG. 18 shows a description of terrain average height information and the problem detection methodology that the base station almanac data base server employs with respect to this information. The terrain average height is required with AFLT because without a height constraint, AFLT fixes could drift wildly. Also knowledge of height allows one less measurement to come from a range measurement, which can greatly improve location fix availability. The base station almanac data base server maintains terrain average height data in the terrain elevation data base (114 in FIG. 11). The base station almanac data base server also tracks the heights returned from location fixes with low uncertainties, and updates the terrain average height in the base station almanac data base as appropriate, and automatically set terrain standard deviation to reflect the distribution of actual fixes.

FIG. 19 shows a description of the round-trip delay (RTD) calibration and forward link calibration information and the problem detection methodology that the base station almanac data base server employs with respect to this information.

The RTD calibration is intended specifically to improve the accuracy of reverse-link AFLT range measurements. The base station almanac data base server automatically improve RTD calibration and RTD calibration accuracy over time by employing real user measurements.

The forward link calibration is intended specifically to improve the accuracy of forward-link terrestrial AFLT range measurements in IS-95 CDMA systems. Forward link calibration errors translate to AFLT Range measurement errors, which translate to position fix errors. The base station almanac data base server automatically improves forward link calibration and forward link calibration accuracy over time by employing real user measurements.

FIG. 20 shows a description of the potential repeater and PN increment information and the problem detection methodology that the base station almanac data base server employs with respect to this information.

The potential repeater information relates to a situation where a repeater is used and the PDE does not know about it. In this situation, AFLT range measurements can be wildly wrong, and the AFLT algorithm becomes unstable. For this reason, any sector identity using a repeater must be noted in the base station almanac data base. The base station almanac data base server detects the presence of an un-noted repeater, and makes appropriate fixes to the base station almanac data base. The base station almanac data base tracks how frequently each noted repeater is observed. The base station almanac data base also removes the repeater use flag or advises an operator if a repeater is considered not to exist.

The PN increment information helps the PDE to correctly resolve the PN offset numbers of distant base stations. Since it is so easy to discover, there is no reason not to include it in the base station almanac data base. The base station almanac data base server detects any PN increment inconsistency between what is observed over the air and what is in the base station almanac data base, and when an inconsistency is detected, the base station almanac data base server corrects the PN increment information in the base station almanac data base.

FIG. 21 shows a description of the uncertainty parameters and the problem detection methodology that the base station almanac data base server employs with respect to the uncertainty parameters. The uncertainty parameters, such as "antenna location accuracy", "terrain height standard deviation", "RTD calibration accuracy", and "FLC accuracy" give bounds to their respective location and calibration parameters and allow the PDE to construct an overall uncertainty to the range measurements that uses these parameters, and thus an error estimate for the final position fix.

For example, for antenna location accuracy, the bound is 99% certainty that the antenna latitude and longitude is within this distance of the true position. For terrain height standard deviation, the bound is that approximately 68% of the heights to be found in this sector's coverage area are within one terrain height standard deviation of the terrain average height. For RTD calibration accuracy, the bound is 99% confidence that the true RTD calibration is within one RTD calibration accuracy of the RTD calibration value For FWD link calibration accuracy, the bound is 99% confidence that the true forward link calibration is within one FWD link calibration accuracy of the FWD link calibration value.

When highly accurate final location fixes are available, the base station almanac data base server uses this knowledge to assess the uncertainty of the terrestrial range measurements seen in these fixes. The base station almanac data base server allocates this uncertainty to the uncertainty parameters that were used to construct each range, and automatically updates uncertainty parameters once a sufficient number of samples exist to establish confidence in the new values. The base station almanac data base server track changes over time, and updates the uncertainty parameters in the base station almanac data base.

Many of the problem detection methods discussed above use the fact that an estimate of the cellular handset's position is known to reasonably good accuracy based on the result of the location fix itself. This knowledge is key to providing context to the fix measurements that are analyzed and saved by the base station almanac data base server.

Additionally, the handset's location fix uncertainty is calculated by the PDE. This uncertainty further enhances the usefulness of knowing the handset location by, for example, allowing only fixes with very good accuracy to be used for purposes that are only valid in this case.

As listed in FIG. 22, examples of problem detection methods that use an estimate of the cellular handset's position include: inverse sector antenna positioning (as further described below); the forward link calibration and RTD calibration; resolving incorrect sector identity in the PDE; spotting the presence of repeaters; spotting new or moved sectors; determining uncertainty parameters; and providing cellular coverage maps & diagnostic information.

Inverse sector antenna positioning is a way of determining the location of a sector antenna from data from a mobile station. In some cases, a cell sector is known to exist based on handset measurements of that sector's signal, but the sector antenna location is not known. If the handset position can be determined based on other measurements, that handset position and the measured range to the sector antenna can serve as a valuable input for determining the location of the sector antenna.

In many cases, a handset position can be determined without knowing the source of the unknown sector—for example based on a good GPS fix, or an AFLT or hybrid fix that does not use a measurement from the unknown sector. If this happens multiple times, from different positions, each of these location-fixes serves as both an origin point (the handset position) and a range to this unknown sector's antenna position.

These positions and ranges can serve as inputs to a navigation processor, which can calculate the sector antenna position in the same way that, for example, GPS satellite positions and ranges are used to calculate the position of a GPS receiver. Many methods are available for doing this navigation processing, such as least-mean-squares iteration, and Kalman filtering, and are well understood by one of ordinary skill in the art.

As one of ordinary skill in the art can also appreciate, it is important that the reference points are sufficiently far apart, compared to the ranges to the sector antenna, so that the geometry is adequate to accurately calculate the sector antenna position. Additionally, each input range from the handset positions should have an error estimate associated with it that combines both the uncertainty in the reference handset position, and the estimated uncertainty in the range based on, for example, possible excess path length signal delays. These measurement error estimates can be combined in the navigation-processing algorithm to estimate the error in the determination of sector antenna position.

Also, the range measurements to the sector antenna may contain a fairly constant bias due to sector transmitter time bias. This forward-link calibration can be solved for at the same time as the sector antenna position. Thus three-dimensional sector antenna position, as well as time-bias, a total of four variables, can be calculated in the same operation—in a manner similar to GPS receiver positioning that calculates GPS receiver position and clock bias.

One way to improve the base station position and base station timing offset is to keep a log of the measurements pertinent to the base station position and timing offset, and to re-compute the base station position based on all of the measurements in the log. When the number of measurements becomes large, however, the computation time will become excessive. At this point, the base station position and timing offset can be computed using only a certain number of the most recent measurements. In addition, it is possible to use a filter, such as a Kalman filter, in order to improve continuously the value of the base station position and timing offset. In a simple example, the most recent measurements produce an estimated position ($P_e$), and the new position ($P_{new}$) is computed as a weighted average of the old position ($P_{old}$) and the estimated position ($P_e$) as follows:

$$P_{new} = \alpha(P_e) + (1-\alpha)(P_{old})$$

where $\alpha$ is a weighting factor less than one. The weighting factor is chosen based on the respective number of measurements (N) and the respective average of the relative error (E) of the measurements contributing to the old value and the estimated value, for example, according to:

$$\alpha = (N_e/E_e)/(N_e/E_e + N_{old}/E_{old})$$

A filter can also be used in a similar fashion to compute a new value for the base station timing offset from the old value and a new estimate, but in this case it is advantageous to estimate drift of the timing offset over time. In other words, the base station timing offset ($T_{off}$) is modeled as a linear function of time (t); $T_{off} = \beta t + T_o$. From a series of measurements over time, the parameters $\beta$ and $T_o$ are estimated by the method of least squares. When the number of measurements in the series becomes excessive, only a reasonable number of the most recent measurements are retained in the log and used to produce an estimated value for $\beta$ and an estimated value for $T_o$. A new value for $\beta$ is computed from the estimated value of $\beta$ and the old value of $\beta$, and a new value for $T_o$ is computed from the estimated value of $T_o$ and the old value of $T_o$.

Weighting factors can also be used in computing the position and timing offset of mobile stations from various location service parameters. For example, a number of ranges must be combined in order to triangulate the position of a mobile station. This is true for AFLT, RTD, or GPS techniques. Where it is possible to perform a number of relatively independent position determinations, a position value and uncertainty can be computed for each independent position determination, and then a weighted average of the position values can be computed, using respective weights inversely proportional to the uncertainty for each position value. For example, the uncertainty of a range measurement may be dependent on pilot signal strength, the resolution of PN sequences, satellite elevation in the case of a GPS range measurement, and the possibility of multi-path propagation in the case of terrestrial range measurements. The uncertainty of a range measurement is also dependent upon the uncertainty of the underlying location service parameters, such as the uncertainty in forward link calibration timing offset in the case of an AFLT range determination, the uncertainty in reverse link calibration in the case of an RTD range measurement, and the uncertainty of base station antenna position and terrain elevation in the case of AFLT or RTD range measurements. The uncertainty, for example, is quantified in terms of a standard deviation, based on statistics when there is sample population, or based on known resolution and estimated measurement error assuming a Gaussian distribution.

It is recognized that solving for the vertical height of the sector antenna may sometimes be difficult, due to limited observable geometry in the vertical direction. The sector antenna height can be estimated based on an average antenna height (say 10 meters) above the average height of the handset reference positions and/or the terrain height based on a lookup into a terrain elevation database. While the errors in the vertical height of the sector antenna are somewhat hard to observe with this method, it is fortunate that those same errors contribute very little to location fix error when that sector is eventually added to the base station almanac data base and used as a reference location for handset positioning.

Once the sector antenna position has been reasonably determined by this method, a new sector can be added to the base station almanac data base and subsequently used for handset positioning, or an unidentified signal seen by the handset can be joined to an entry in the base station almanac data base with incorrect identity information and this identity information can be corrected.

An additional function that results from the base station almanac data base server is a detailed understanding of cellular coverage. The base station almanac data base server can relate position to the signal strengths and other cellular diagnostic information of all cell sectors seen from this position. Coverage maps and diagnostic metrics are possible based on this knowledge. Customers can be alerted to degraded or impaired cellular or location performance as a function of their location.

In view of the above, there has been described a wireless telecommunication network including hybrid (GPS and AFLT) mobile stations. The hybrid mobile stations provide redundant position information, which is used for time base calibration and/or correction of position measurements. Every mobile station (i.e., handset or cellular phone) can be used as a test instrument, and data from regular wireless phone calls can be supplemented by data from drive-around field test units. The time base and/or position offsets are stored in a base station almanac data base along with other information used for obtaining the most reliable position fixes under a variety of conditions. An automatic system is provided for creating, updating, and maintaining the base station almanac data base. In general, the automatic system uses knowledge of a GPS fix to give context to terrestrial ranging information and other measurements taken by the cellular handset. The automatic system detects incomplete or inaccurate information, and then makes automatic fixes and/or advises a system operator. The automatic system performs calibration of parameters in the base station almanac data base.

The invention claimed is:

1. A method for use in a wireless communication network, the method including:
   maintaining forward link calibration and associated uncertainty from single base stations, including a first base station, the forward link calibration corresponding to a time difference between a transmission time stamp and an actual transmission time of signals received at the base stations; and
   using the forward link calibration and associated uncertainty to improve the accuracy of terrestrial range measurements and obtain more accurate determination of the position of at least one mobile station within the wireless communication network,
   wherein the forward link calibration and associated uncertainty of the first base station is used independently of signals from other base stations to improve the accuracy of terrestrial range measurements between the at least one mobile station and the first base station.

2. The method of claim 1, which further includes providing a system operator with cellular coverage maps.

3. The method of claim 1, which includes maintaining and using round trip delay calibration and associated uncertainty, to improve the accuracy of mobile station positioning.

4. The method of claim 1, where the mobile stations include hybrid mobile stations having satellite positioning system (SPS) receivers for obtaining location data from a satellite positioning system.

5. The method of claim 1, which further includes creating a base station almanac data base by automatically assembling the base station almanac data base from existing, known data and default forward link calibration values, and automatically maintaining the base station almanac data base by iteratively gathering location fix data from the position determining entity and updating the base station almanac data base with the location fix data from the position determining entity.

6. The method of claim 1, which includes automatically resolving incorrect sector identity.

7. The method of claim 1, which includes automatically spoiling the presence of repeaters.

8. The method of claim 1, which includes automatically spoiling new or moved sectors.

9. The method of claim 1, which includes automatically updating a maximum antenna range for each base station.

10. The method of claim 1, which includes automatically tracking long term location determination system trends by correlating location determination performance to particular areas or regions and particular cellular infrastructure.

11. The method of claim 1, which further includes maintaining a terrain elevation data base.

12. The method of claim 11, which further includes using the terrain elevation data base to maintain and improve a base station almanac.

13. The method of claim 1, which further includes operating a graphical user interface to advise a system operator of repairs to inaccurate or incomplete data.

14. The method of claim 13, which further includes providing the system operator with cellular coverage maps.

15. The method of claim 1, which further includes automatically adjusting a base station almanac.

16. The method of claim 15, which further includes notifying a system operator of the automatic adjustments to the base station almanac.

17. The method of claim 1, which includes automatically updating a sector center location for each base station sector.

18. The method of claim 17, wherein the sector center is updated to be an average location of the mobile stations within the base station sector antenna coverage area.

19. A wireless communication network comprising:
   (a) base stations, including a first base station, for communication with mobile stations;
   (b) at least one position determining entity for determining positions of the mobile stations based on signals transmitted between the base stations and the mobile stations, and information stored in a base station almanac data base; and
   (c) a base station almanac data base server for maintaining accurate forward link calibration and an associated uncertainty from single base stations, in order to improve accuracy of terrestrial range measurements and obtain more accurate determination of positions of the mobile stations, p1 wherein the forward link calibration and associated uncertainty of the first base station is used independently of signals from other base stations to improve the accuracy of terrestrial range measurements between mobile stations and the first base station, and wherein the forward link calibration of the first base station corresponds to a time difference between a transmission time stamp and an actual transmission time of signals transmitted between the mobile stations and the first base station.

20. The wireless communication network of claim 19 which includes more than one position determining entity and more than one base station almanac data base server, wherein each position determining entity is serviced by more than one base station almanac data base server in order to provide redundancy.

21. The wireless communication network of claim 19, wherein the base station almanac data base server maintains a data base of performance tracking information about performance of the position determining entity.

22. The wireless communication network of claim 19, wherein the base station almanac data base server maintains round trip delay calibration and associated uncertainty.

23. The wireless communication network of claim 19, wherein the base station almanac data base server is programmed for creating the base station almanac data base by assembling the base station almanac data base from existing, known data and default forward link calibration values, and for maintaining the base station almanac data base by iteratively gathering location fix data from the position determining entity and updating the base station almanac data base with the location fix data from the position determining entity.

24. The wireless communication network of claim 19, wherein the base station almanac data base has field groups include cell sector identity information, pilot sector name, antenna position, cell sector centroid position, antenna orientation, antenna opening, maximum antenna range, terrain average height, round trip delay calibration, forward link calibration, potential repeater information, PN increment, and uncertainty parameters.

25. The wireless communication network of claim 19, wherein the base station almanac data base server is programmed for resolving incorrect sector identity based on an estimate of position of at least one of the mobile stations.

26. The wireless communication network of claim 19, wherein the base station almanac data base server is programmed for spoiling the presence of repeaters based on an estimate of position of at least one of the mobile stations.

27. The wireless communication network of claim 19, wherein the base station almanac data base server is programmed for spoiling new or moved sectors based on an estimate of position of at least one of the mobile stations.

28. The wireless communication network of claim 19, wherein the base station almanac data base server is programmed for updating a maximum antenna range for each base station.

29. The wireless communication network of claim 19, wherein the base station almanac data base server is programmed for tracking long term location determination system trends by correlating location determination performance to particular areas or regions, and particular cellular infrastructure.

30. The wireless communication network of claim 19, wherein the base station almanac data base server maintains a terrain elevation data base.

31. The wireless communication network of claim 30, wherein the base station almanac data base server uses the terrain elevation data base to maintain and improve a base station almanac.

32. The wireless communication network of claim 19, which further comprises a graphical user interface to the base station almanac data base server, the graphical user interface permitting the base station almanac data base server to advise a system operator of possible presence of incomplete or inaccurate data in the base station almanac data base and to advise of repairs to the inaccurate or incomplete data.

33. The wireless communication network of claim 32, wherein the base station almanac data base server provides the system operator with cellular coverage maps.

34. The wireless communication network of claim 19, wherein the base station almanac data base server stores a primary copy of the base station almanac data base, and the position determining entity stores a local copy of the base station almanac data base.

35. The wireless communication network of claim 34, wherein the position determining entity provides position fix measurement information to the base station almanac data base server as position fixes occur, and the base station almanac data base server periodically updates the local copy of the base station almanac data base.

36. The wireless communication network of claim 19, wherein the base station almanac data base server is programmed for updating a cell sector center location for each base station.

37. The wireless communication network of claim 36, wherein the sector center is updated to be an average location of the mobile stations within the base station sector antenna coverage area.

38. The wireless communication network of claim 37, wherein the base station almanac data base server is programmed for updating a cell sector center location for each base station.

39. The wireless communication network of claim 38, wherein the sector center is updated to be an average location of the mobile stations within the base station sector antenna coverage area.

40. A wireless communication network comprising:
base stations, including a first base station, for communication with mobile stations;
at least one position determining entity for determining positions of the mobile stations based on signals transmitted between the base stations and the mobile stations, and information stored in a base station almanac data base; and
a base station almanac data base server for maintaining accurate forward link calibration and an associated uncertainty from single base stations, in order to improve accuracy of terrestrial range measurements and obtain more accurate determination of positions of the mobile stations, wherein the forward link calibration and associated uncertainty of the first base station is used independently of signals from other base stations to improve the accuracy of terrestrial range measurements between mobile stations and the first base station, wherein the forward link calibration of the first base station corresponds to a time difference between a transmission time stamp and an actual transmission time of signals transmitted between the mobile stations and the first base station; and
wherein the base station almanac data base server provides a system operator with cellular coverage maps.

41. A wireless communication network comprising:
(a) base stations for communication with mobile stations having global positioning system (GPS) receivers,
(b) at least one position determining entity (PDE) that determines the position of the mobile stations based on transmissions between the base stations and the mobile stations, and based on information stored in a base station almanac data base; and
(c) a base station almanac data base server that receives mobile station locations provided by the PDE and GPS receivers, modifies forward link calibration information contained in the base station almanac data base based on the PDE and the GPS locations, and tracks long term location determination system trends by correlating location determination performance to particular areas or regions and particular cellular infrastructure, wherein the forward link calibration information corresponds to a time difference between a transmission time stamp and an actual transmission time of signals transmitted between the base stations and the mobile stations.

42. The wireless communication network of claim 41, wherein the base station almanac data base server is programmed for resolving incorrect sector identity.

43. The wireless communication network of claim 41, wherein the base station almanac data base server is programmed for spotting the presence of repeaters.

44. The wireless communication network of claim 41, wherein the base station almanac data base server is programmed for spoiling new or moved sectors.

45. The wireless communication network of claim 41, wherein the base station almanac data base server is programmed for updating a maximum antenna range for each base station.

46. A wireless communication network, comprising:
means for maintaining forward link calibration and associated uncertainty from single base stations including a first base station, the forward link calibration corresponding to time differences between a transmission time stamp and an actual transmission time of signals received at the base stations; and means for using the forward link calibration and associated uncertainty to improve the accuracy of terrestrial range measurements and obtain more accurate determination of the position of at least one mobile station within the wireless communication network, wherein the forward link calibration and associated uncertainty of the first base station is used independently of signals from other base stations to improve the accuracy of terrestrial range measurements between the at least one mobile station and the first base station.

47. The wireless communication network of claim 46, further comprising;

means for maintaining and using round trip delay calibration and associated uncertainty to improve the accuracy of mobile station positioning.

48. The wireless communication network of claim 46, further comprising:

means for creating a base station almanac data base by automatically assembling the base station almanac data base from existing, known data and default forward link calibration values, and automatically maintaining the base station almanac data base by iteratively gathering location fix data from the position determining entity and updating the base station almanac data base with the location fix data from the position determining entity.

49. The wireless communication network of claim 46, further comprising:

means for automatically tracking long term location determination system trends by correlating location determination performance to particular areas or regions and particular cellular infrastructure.

50. The wireless communication network of claim 46, further comprising:

means for maintaining a terrain elevation data base.

51. The wireless communication network of claim 50, further comprising:

means for using the terrain elevation data base to maintain and improve a base station almanac.

* * * * *